(12) United States Patent
Islam et al.

(10) Patent No.: US 12,374,947 B2
(45) Date of Patent: Jul. 29, 2025

(54) TORQUE DENSITY AND EFFICIENCY IMPROVEMENT IN AC MACHINES

(71) Applicant: North Carolina State University, Raleigh, NC (US)

(72) Inventors: Md Sariful Islam, Raleigh, NC (US); Adeeb Ahmed, Raleigh, NC (US); Iqbal Husain, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 854 days.

(21) Appl. No.: 17/290,362

(22) PCT Filed: Oct. 30, 2019

(86) PCT No.: PCT/US2019/058871
§ 371 (c)(1),
(2) Date: Apr. 30, 2021

(87) PCT Pub. No.: WO2020/092570
PCT Pub. Date: May 7, 2020

(65) Prior Publication Data
US 2021/0408855 A1    Dec. 30, 2021

Related U.S. Application Data

(60) Provisional application No. 62/752,946, filed on Oct. 30, 2018.

(51) Int. Cl.
*H02K 3/12* (2006.01)
*H02K 1/16* (2006.01)
*H02K 21/14* (2006.01)

(52) U.S. Cl.
CPC ............. *H02K 3/12* (2013.01); *H02K 1/16* (2013.01); *H02K 1/165* (2013.01); *H02K 21/14* (2013.01); *H02K 2213/03* (2013.01)

(58) Field of Classification Search
CPC .......... H02K 3/12; H02K 3/14; H02K 2213/03
(Continued)

(56) References Cited

U.S. PATENT DOCUMENTS 7,696,058 B2    4/2010  Kakehata et al.
2010/0045133 A1    2/2010  Ciampolini
(Continued)

FOREIGN PATENT DOCUMENTS

JP    2012186938 A  *  9/2012
JP    2017216832 A  *  12/2017

OTHER PUBLICATIONS

Machine translation of JP-2012186938-A (Year: 2012).*
(Continued)

*Primary Examiner* — Oluseye Iwarere
*Assistant Examiner* — Minki Chang
(74) *Attorney, Agent, or Firm* — Thomas | Horstemeyer, LLP

(57) ABSTRACT

Various examples related to stator and rotor configurations for the improvement in torque density and/or efficiency in AC machines are presented. In one example, a bar wound stator includes a stator core with winding slots; a first group of bar type conductors in the winding slots adjacent to a proximal end adjacent to a rotor air gap surface of the stator core; and a second group of bar type conductors in the winding slots adjacent to a distal end adjacent to a back-iron section of the stator core. The first group of bar type conductors having a first cross-sectional area and the second group of bar type conductors having a second cross-sectional area greater than the first cross-sectional area. In another example, a motor includes the bar wound stator and a rotor such as, e.g., a permanent magnet rotor. The motor can be utilized in hybrid or battery electric vehicles.

20 Claims, 17 Drawing Sheets

(58) Field of Classification Search
USPC .................................................. 310/201–207
See application file for complete search history.

(56) References Cited

U.S. PATENT DOCUMENTS

| | | | |
|---|---|---|---|
| 2013/0026875 A1* | 1/2013 | Hao | ........................ H02K 3/12 |
| | | | 310/198 |
| 2014/0167547 A1 | 6/2014 | Hao | |
| 2017/0250588 A1 | 8/2017 | Kaiser et al. | |
| 2018/0097431 A1 | 4/2018 | Laldin et al. | |
| 2018/0152067 A1* | 5/2018 | Götz | .................. H02K 15/0442 |
| 2018/0152068 A1* | 5/2018 | Götz | ........................ H02K 3/12 |
| 2018/0152070 A1* | 5/2018 | Sheu | ........................ H02K 3/12 |

OTHER PUBLICATIONS

Machine translation of JP-2017216832-A (Year: 2017).*
International Search Report for PCT/US2019/058871 mailed Jan. 21, 2020.

* cited by examiner

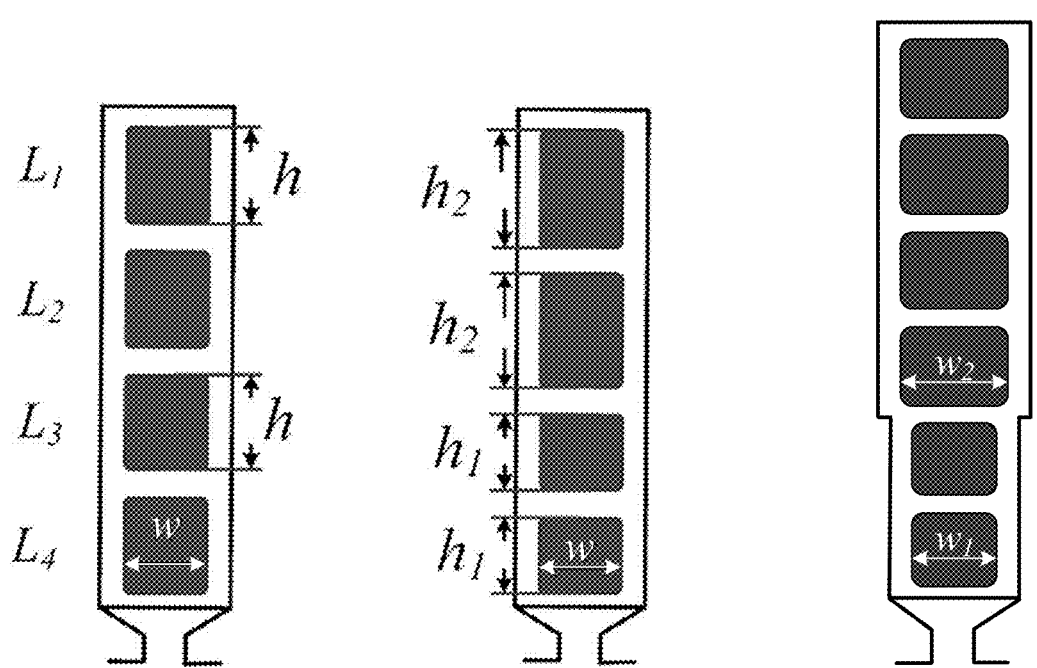
FIG. 1A    FIG. 1B    FIG. 1C
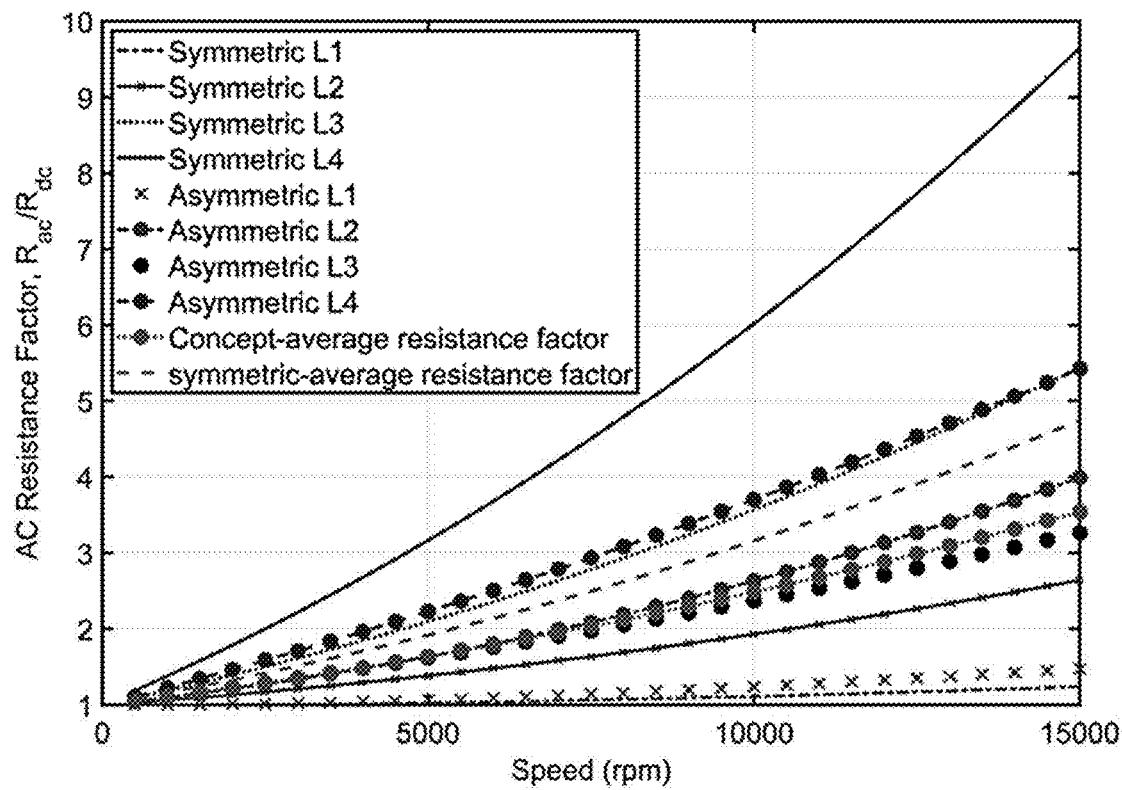
FIG. 2

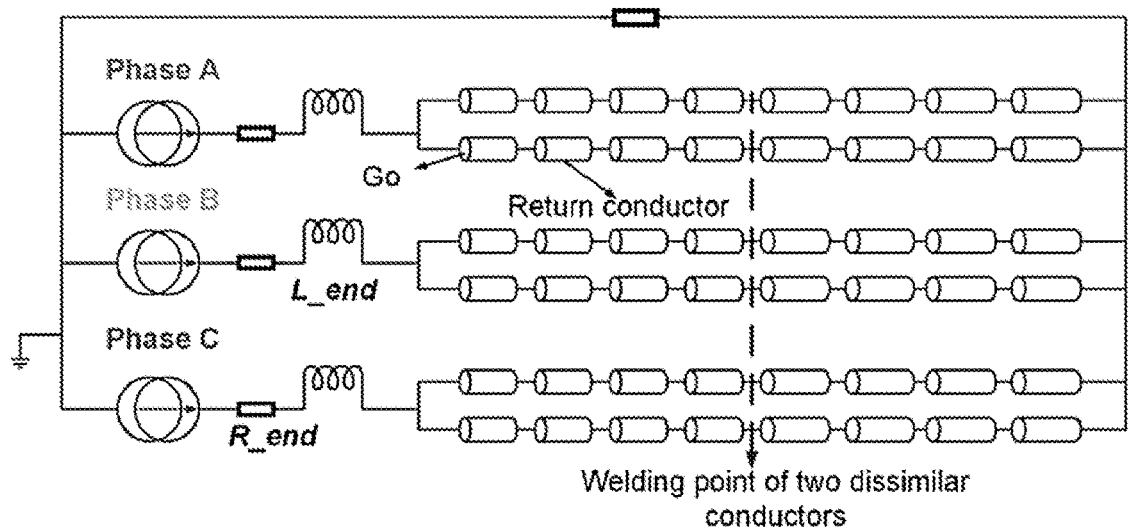

FIG. 4A

TABLE I: 100 kW, 72S/12P IPM Design Specifications

| Parameters | Symmetric Bar Wound Machine | Asymmetric Bar Wound Machine |
|---|---|---|
| Peak Torque, $T_{peak}$ | 190 Nm | 190 Nm |
| Current, $I_{max}$ | 400 $A_{rms}$ | 400 $A_{rms}$ |
| DC link Voltage, $V_{dc}$ | 280 V | 280 V |
| Outer Diameter, $OD$ | 204 mm | 204 mm |
| Active Length, $L_{stk}$ | 63 mm | 63 mm |
| Maximum speed, $\omega_{max}$ | 15,000 rpm | 15,000 rpm |
| Cooling | Spiral Water Jacket (Ethylene–Glycol) | Spiral Water Jacket (Ethylene–Glycol) |

FIG. 4B

TABLE II: Key Parameters for Symmetric and Asymmetric Bar Wound Machine

| Parameters | Symmetric Bar Wound Machine | Asymmetric Bar Wound Machine |
|---|---|---|
| Stator outer diameter (mm) | 204 | 204 |
| Stator inner diameter (mm) | 139.2 | 139.2 |
| Rotor outer diameter (mm) | 138 | 138 |
| Slot width (mm) | 3.65 | 3.65 |
| Slot depth (mm) | 15.65 | 15.65 |
| Fill factor (copper area/available slot area) | 0.6 | 0.6 |
| $A_1, A_2, A_3, A_4 (w.h)$ (mm) | $w = 2.74, h = 2.94$ | $w = 2.74, h_1 = (1 - x) \cdot h$ |
| $A_5, A_6, A_7, A_8 (w.h)$ (mm) | $w = 2.74, h = 2.94$ | $w = 2.74, h_2 = (1 + x) \cdot h$ |
| Magnet | N48UH | N48UH |
| Lamination (mm) | 0.27 | 0.27 |

FIG. 7A

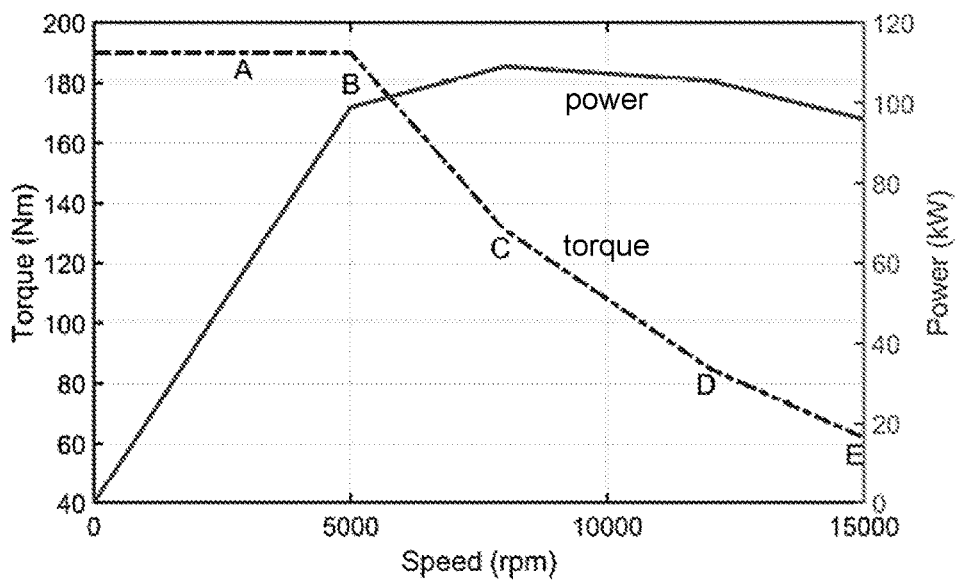

FIG. 7B

TABLE III: Loss Components at 5,000 rpm

| Components | Symmetric Design | Asymmetric Design |
|---|---|---|
| Current (Arms) | 400 | 400 |
| Torque (Nm) | 190 | 190 |
| DC conductor loss (W) @ 100 °C | 2,570 | 2,648 |
| AC conductor loss (W) @ 100 °C | 1,033 | 704 |
| Total conductor loss (W) @ 100 °C | 3,603 | 3,352 |
| Core loss (W) | 498 | 498 |
| Mechanical loss (W) | 0 | 0 |
| Efficiency (%) | 96.0 | 96.30 |

TORQUE DENSITY AND EFFICIENCY IMPROVEMENT IN AC MACHINES

CROSS-REFERENCE TO RELATED APPLICATIONS

This application is a national stage entry pursuant to 35 U.S.C. § 371 of International Application No. PCT/US2019/058871, filed on Oct. 30, 2019, which claims priority to, and the benefit of, U.S. provisional application entitled "Torque Ripple Reduction, Torque Density Improvement and Efficiency Improvement in AC Machines" having Ser. No. 62/752,946, filed Oct. 30, 2018, both of which are hereby incorporated by reference, in their entireties.

STATEMENT REGARDING FEDERALLY SPONSORED RESEARCH OR DEVELOPMENT

This invention was made with government support under grant number EEC0812121 awarded by the National Science Foundation. The government has certain rights in the invention.

BACKGROUND

AC electric machines have multi-teeth stators that house the phase windings of the AC machine in stator slots. The most common type of electric motor is a three-phase motor. Conventional AC windings of commercial machines are fully-pitched or chorded type. The conductors in these windings are either stranded conductor or bar conductors. Stators with bar conductors have the advantage of high fill factor, lower DC resistance, high short term output power capability, better thermal performance compared to the stranded coil conductors. However, the bar conductor suffers from high AC loss (proximity and skin). The conductors close to the air gap have the maximum losses and increase the chance of thermal hot spot. Additionally, bar conductor stators have teeth with an unequal width where it is thinner close to air gap and wider away from air gap.

SUMMARY

Aspects of the present disclosure are related to stator and rotor configurations for the improvement in torque density and/or efficiency in AC machines.

In one aspect, among others, a bar wound stator comprises a stator core comprising winding slots that extend generally radially outward from a proximal end adjacent to a rotor air gap surface of the stator core to a distal end adjacent to a back-iron section of the stator core; a first group of bar type conductors disposed in the winding slots adjacent to the proximal end, the first group of bar type conductors having a first cross-sectional area; and a second group of bar type conductors disposed in the winding slots adjacent to the distal end, the second group of bar type conductors having a second cross-sectional area greater than the first cross-sectional area. In one or more aspects, the first group of bar type conductors can have a first height and the second group of bar type conductors can have a second height greater than the first height. The first height is $(1-x)h$ and the second height can be $(1+x)h$, where $0<x<1$. The x can be less than or equal to 0.25, or can be less than or equal to 0.2, or can be less than or equal to 0.15, or can be less than or equal to 0.1.

In various aspects, the first group of bar type conductors can have a first width and the second group of bar type conductors can have a second width greater than the first width. A proximal end width of the winding slots can be less than a distal end width of the winding slots. The proximal end width can be constant over a height of the first group of bar type conductors and the distal end width can be constant over a height of the second group of bar type conductors. The first group of bar type conductors can have M bar conductors and the second group of bar type conductors can have at least M bar conductors. A total number of conductors in the first group of bar type conductors can be less than a total number of conductors in the second group of bar type conductors. In some aspects, the first group and second group of bar type conductors can be coupled together to form a wave winding in the stator core. The wave winding can have a hairpin construction. A conductor of the first group of bar type conductors can be coupled to a conductor of the second group of bar type conductors by a weld.

In another aspect, a motor comprises the bar winding stator and a rotor. In one or more aspects, the rotor can be a permanent magnet (PM) rotor. The PM rotor can be an interior PM rotor. The motor can be utilized in hybrid electric vehicles (HEVs) and/or battery electric vehicles (BEVs).

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A-1C illustrate examples of conventional symmetric and asymmetric bar windings, respectively, in accordance with various embodiments of the present disclosure.

FIG. 2 illustrates an example comparing layer wise AC resistance factors of symmetric and asymmetric bar windings of FIGS. 1A and 1B, in accordance with various embodiments of the present disclosure.

FIG. 4A is a schematic diagram illustrating an example of an electrical equivalent circuit model of the IPM machine model of FIG. 3, in accordance with various embodiments of the present disclosure.

FIG. 4B is a table illustrating design specifications of the IPM machine model of FIG. 3, in accordance with various embodiments of the present disclosure.

FIG. 7A is a table illustrating parameter examples for symmetric and asymmetric bar wound machines, in accordance with various embodiments of the present disclosure.

FIGS. 7B and 7C illustrate examples of torque-speed and power-speed profiles, and current and voltage as different operating points of the torque-speed profile, in accordance with various embodiments of the present disclosure.

FIGS. 12A-12C, 13A-13C and 14A-140 illustrate examples of steady-state temperature distributions of symmetric and asymmetric windings at various load conditions, in accordance with various embodiments of the present disclosure.

DETAILED DESCRIPTION

Figure 3:
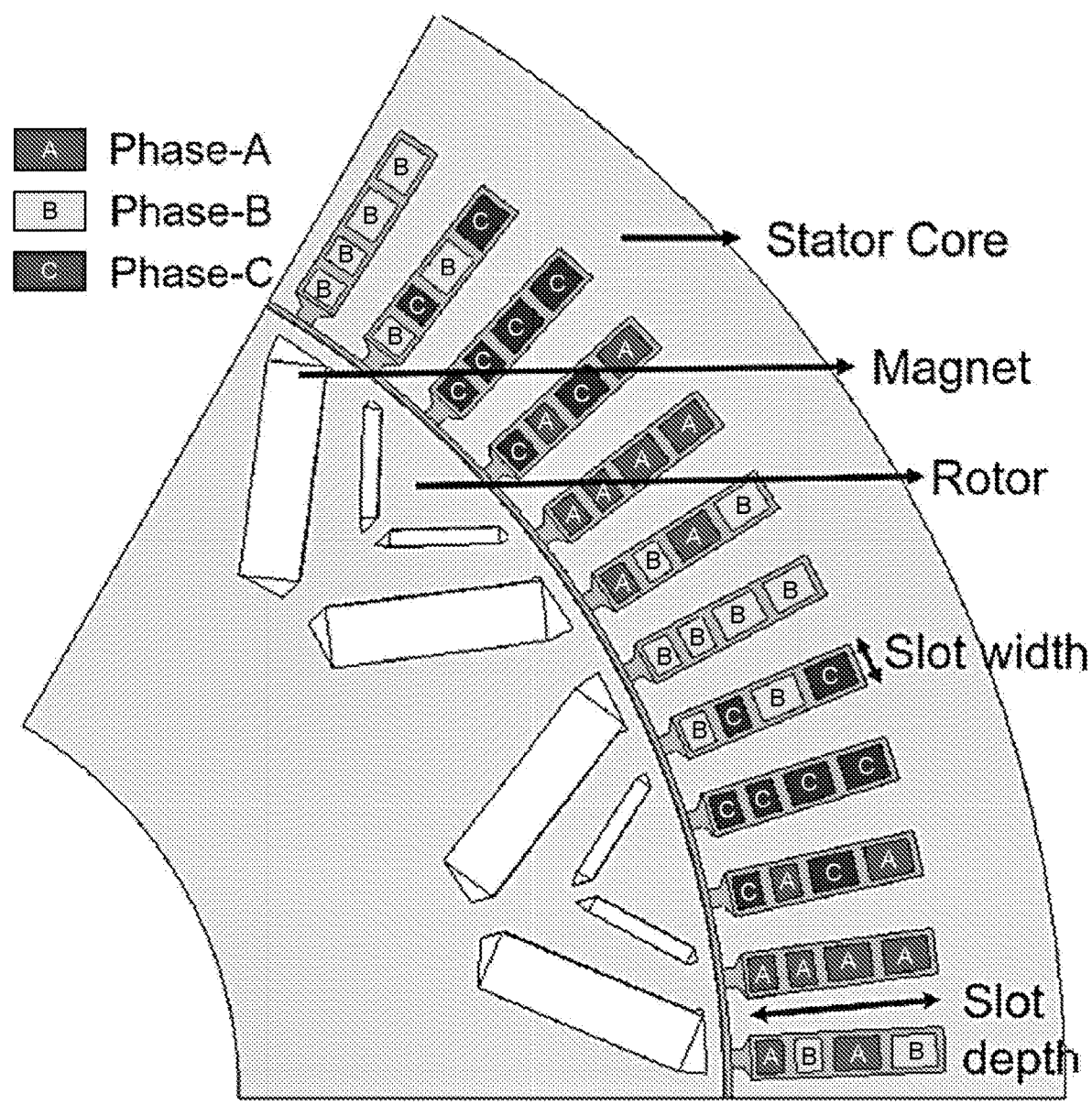
FIG. 3 is a cross-sectional schematic diagram illustrating an example of a 100 kW, 72 slot, 12 pole interior permanent magnet (IPM) finite element analysis (FEA) machine model, in accordance with various embodiments of the present disclosure.

Disclosed herein are various examples related to stator and rotor configurations for the improvement in torque density and/or efficiency. A new design for bar wound stators is disclosed that can hold the positive features of bar conductors having compact features, reduced DC copper loss, easier assembly, high fill factor, better thermal performance. Moreover, it can reduce the problem of high AC losses associated with bar conductors and can also simultaneously reduce the problem of the unequal teeth width.

Widespread research in the area of electric machines for traction applications is pushing the boundaries for maximum speed and power density with design innovations in rotor design, magnets, and winding designs. The demand for increased torque and power density to enhance fuel efficiency in hybrid electric vehicles (HEVs) and battery electric vehicles (BEVs) is driving the research in electric machines for traction applications. For modern HEVs and BEVs, the fuel efficiency translates to mileage for a given battery charge. The design innovations in electric machines seek higher efficiency, greater power density, and lower cost. Electric machines with higher operating speeds are feasible using higher mechanical gear ratios. Consequently, higher torque-density and power-density can be achieved. It has been demonstrated that the increase in operating speed of vehicular electric motors compared to that of previous models can help to increase the peak power density of the motor by 45%. Recent evolution of wide bandgap (WBG) semiconductor-based drives with their capabilities of higher frequency and higher temperature operation can also be a catalyst to increase the operating speed of traction machines. WBG drives can improve efficiency, power density, and controllability on a system-level. For example, Tesla is the leading car manufacturer to integrate a full silicon carbide (SiC) power module in its new electric vehicles.

Permanent magnet (PM) motors are the most popular candidate for electric machines in traction applications. Among these, interior PM (IPM) machines provide high power density, high efficiency, and wide speed range that are required for traction applications. The stator winding of PM traction machines can be wound using stranded wires or flat rectangular bar conductors. Form-wound windings, also known as bar conductors, are gaining popularity in traction applications because of its inherent advantages over the round stranded conductor. Stators with bar conductors can provide lower DC resistance, higher fill factor, better thermal performance, improved cooling performance due to a larger surface area, improved high voltage protection, and automated manufacturing process. Bar wound stator can provide better low to medium speed energy efficiency compared to stranded conductors wound stators.

Higher AC resistance of bar windings due to the proximity and skin effects can cause the continuous output power capability to decrease faster in the high-speed region. Consequently, this has limited the adoption of bar winding for high-speed machines. It has been shown that the resistance of a bar conductor exceeds that of the stranded conductor at speeds over 9,000 rpm when AC losses dominate the conductor loss. Therefore, careful sizing and placement of conductors in a bar wound machine can keep the AC losses within limits, even for medium-speed applications. Bar conductors, also suffer from uneven distribution of losses that can increase the possibilities of thermal hot spots in the conductors. Several methods may be used to reduce the AC losses of bar-type winding. Increasing the number of conductors in the slot can reduce the total AC losses at the expense of manufacturing complexity, lower fill factor, overload capability, and higher DC resistance. For example, six conductors per slot can be used instead of four to improve the high-speed performance. The conductors closer to the air gap of one slot can be connected with slot-end region conductors of another slot to evenly distribute the loss among the different layers and to eliminate the circulating current through the parallel paths. Transposition of the conductors in the slot can also be used to achieve the objective.

The analysis of AC losses in stator winding using analytical and time-stepped finite element analysis (FEA) are available, but these are mostly for stranded conductors. Modern FEA packages now allow conductor bundles to be broken down into individual conductors in the slot as simple single conducting regions with uniform current density. However, the effect of conductor height, operating speed, and arrangement of conductors in the slots on AC losses of the bar conductors can be shown using an analytical model. Conductor splitting, conductor rearrangement, and different conductor layouts have been proposed as methods to reduce the AC losses of bar winding, although only symmetric bar conductors with the same height and width for all conductors in the slot were considered. Research on bar conductors, especially for medium to high-speed applications, is rare. Moreover, the analysis on the consequences of uneven distribution of conductor losses on thermal performance and continuous output power is also limited.

In this concept, a bar wound stator includes several bars within each slot, where at least one of the bar conductors has a different cross sectional area compared to the others. The conductors close to the rotor air gap will have a lower cross sectional area and the rest of the conductors will have a higher (or larger) cross sectional area while keeping the same copper volume as it was with equal size of bar conductors. The cross sectional area can be changed by either changing height or width or by changing both the dimensions. The height of the conductor is more sensitive to the AC loss (proximity and skin). For example, the height of the conductors which have a lower surface area will be smaller and height of the other conductors will be increased in proportionately while keeping the width same for all the conductors. This method will reduce the total conductor loss and simultaneously will increase the efficiency of the machines. This way it is possible to reduce the AC loss of bar conductor by a substantial amount. This will also increase the continuous output power capability of the motor.

However, due to the higher saturation at the thinner teeth region, peak torque is also reduced. Reducing the width of the conductors of smaller cross sectional area with or without reducing the height can increase the teeth width close to the air gap. This change will improve the peak torque of the machines. Additionally, if peak torque improvement and ac loss reduction are simultaneously needed, then both the height and width of the conductors with smaller bar conductors can be adjusted accordingly. This proposed concept is applicable for all bar wound electric machine topologies including but not limited to permanent magnet synchronous machine, synchronous machine, reluctance machine, and induction machine for both inner and outer rotor configurations.

In this disclosure, the new bar winding concept is presented to reduce the high-speed AC losses of bar wound type stator while preserving the advantages of a conventional bar winding. The disclosed concept can be based on having two different heights for the conductors in each slot and this arrangement is termed as the asymmetric bar winding. The concept of loss reduction is validated using a closed-form equation-based analytical method and time-stepped FEA. Detailed loss performances of the presented concept are compared with the symmetric bars which are the conventional bar winding for a high-speed (15,000 rpm) PM traction machine. Corresponding thermal performance of the disclosed concept is also compared with conventional bar-type stator wound machine with liquid cooling (50% water, 50% ethylene-glycol) through water-jacket. Moreover, the effect of uneven loss distribution in thermal performance and continuous output power is also presented. The concept and the design methodology is first described, followed by the FEA simulation method, and the performance comparison of the disclosed concept with the conventional one.

Asymmetric Bar Winding

Bar conductors are more susceptible to AC losses compared to the stranded conductor due to its larger cross-section. AC losses in the slots may be attributed to the armature reaction and PM flux. The flux density distribution inside the slot affects the magnitude and distribution of the AC losses. Skin effect, proximity effect, and slot leakage flux generate additional copper losses in the winding by changing the distribution and magnitude of the flux density. Skin effect increases with the operating speed and is highly sensitive to the depth in the radial direction of the conductors (height). Proximity effect is the disturbance that changes the magnetic flux pattern due to the magnetic field created by the current in neighboring conductors. AC conductor loss for a rectangular conductor can be predicted using:

$$P_{ac} = lhw^3\omega^2 \frac{B^2}{12\rho}, \quad (1)$$

where l is the length of the machine, h is the height in the radial direction, w is the width of the conductors, ω is the operating speed, B is the magnetic flux density at the position of conductors, and ρ is the resistivity of copper.

The magnetic field from one conductor induces eddy currents in the adjacent conductors and vice-versa, which alters the overall distribution of current flowing through them and reinforces the currents in parallel conductors outward from each other. The net effect is the redistribution of current in the cross-section that can cause thermal hot spots. Conductors furthest from the air gap experience less effect from the magnetic field of other conductors. Therefore, the maximum magnetic flux will pass through the conductor closest to the air gap. Additionally, slot leakage effect is the highest close to the slot-opening area. Hence, conductors near the air gap suffer from higher AC losses.

AC Losses. The average resistance factor $R_{ac}/R_{dc}$ due to the skin proximity effects can be calculated as:

$$\frac{R_{ac}}{R_{dc}} = \phi(k) + \frac{\psi(k)(m^2-1)}{3}, \quad (2)$$

where $$k = h\sqrt{\frac{\pi\mu f w}{\rho W_{slot}}}, \phi(k) = k\frac{\sinh(2k)+\sin(2k)}{\cosh(2k)-\cos(2k)}$$

is the skin effect factor, $$\psi(k) = 2k\frac{\sinh(2k)-\sin(2k)}{\cosh(2k)-\cos(2k)}$$

is the proximity factor, m is the number of conductor layers, h is the height in radial direction, f is the frequency, w is the width of the conductors, $W_{slot}$ is the slot width, ρ is the resistivity of copper, and μ is the permeability of the material. From Eqn. (2), it can be seen that the total AC loss is a strong function of the height of the conductor and the operating frequency. However, the AC resistance factor for each layer can also be calculated if it is assumed that the conductors in each slot are from the same phase group.

The AC resistance factor for the $m^{th}$ layer is:

$$\frac{R_{ac(m)}}{R_{dc}} = \phi(k) + m(m-1)\psi(k), \quad (3)$$

the AC resistance factor for the $(m-1)^{th}$ layer is:

$$\frac{R_{ac(m-1)}}{R_{dc}} = \phi(k) + (m-1)(m-2)\psi(k), \quad (4)$$

and the AC resistance factor for the conductor closest to the back-iron is:

$$\frac{R_{ac(1)}}{R_{dc}} = \phi(k), \quad (5)$$

where m=1 for the conductor/layer that is closest to the back-iron, and m=M for the conductor/layer that is closest to the air gap, as shown in the conventional symmetric bar winding of FIG. 1A and the asymmetric bar winding of FIG. 1B. Therefore, the average resistance factor in a 4-layer winding as in FIGS. 1A and 1B can be found by averaging the AC resistance factor of individual layers as:

$$\frac{R_{ac}}{R_{dc}} = \phi(k) + 5\psi(k). \quad (6)$$

From Eqns. (2) through (6), it is evident that the conductors closer to the air gap will have higher AC losses compared to the conductors that are farther from the air gap. This means that the first conductor after the air gap will have higher AC loss compared to the second conductor from the air gap. Therefore, the inner conductors suffer from increased hotspots, which consequently reduces the continuous output power of the machine at a higher speed of operation. Predicting the AC loss trends with Eqns. (2) through (6) is useful for both symmetric and asymmetric bar windings. However, since the model neglects the local saturation, results considering saturation will be later extracted using FEA for comparison with the analytically predicted trends.

Asymmetric Bar Winding. An effective method to reduce the high-frequency AC losses of the bar wound machine would be to reduce the losses of the conductors close to the air gap. Total AC losses can be substantially reduced by using optimum heights for the bar conductors within a slot.

1) The heights of the bar conductors that are closer to the air gap will be reduced by x % compared to the regular symmetric design, while the height of the remaining conductors will be increased by x % without changing the width as shown in FIG. 1B.
2) The heights of the conductors can be calculated from, $h_1=(1-x)h$, $h_2=(1+x)h$, for $x<1$. Therefore, the conductors of larger height will be closer to the stator yoke.
3) Consider that N is the number of conductors in the slot. If N/2 is even, then the number of conductors close to the air gap in a slot will be N/2, otherwise the number of conductors close to the air gap in a slot is N/2−1. Moreover, only an even number of conductors/slot is possible for a hairpin winding. However, the selection of the number of conductors with reduced height can be done in such a way to ensure the same cross-sectional area in a single hairpin and also to ensure a maximum of two sizes of conductors in the slot to minimize the manufacturing complexity (Examples of winding layout and pattern will be presented below).

Per the algorithm, in 4-conductor/slot and 6-conductor/slot designs, the first two conductors closest to the air gap will have a smaller height, while in an 8-conductor/slot design, the first four conductors will be of smaller height compared to the remaining conductors in the slot. The winding layout uses a pattern to ensure zero circulating current through the parallel paths. The fill factor of the stator will be the same as that of the symmetric design as the total slot area, copper volume, and insulation space are kept the same. In the designed asymmetric bar wound stator, only two sizes of conductors in the slot are considered to minimize the manufacturing complexity. Two sizes of bars will add one extra manufacturing step in preparing two different hairpin conductors. Otherwise, the material volume, welding numbers, and hairpin numbers remain the same. FIG. 1C shows an example of a 6-conductor/slot design with a first group of bar conductors having a first width and a second group of bar conductors having a second width greater than the first width, and a total number of conductors in the first group less than a total number of conductors in the second group. A proximal end width of the winding slot is less than a distal end width of the winding slot, with the proximal end width constant over a height of the first group of bar conductors and the distal end width constant over a height of the second group of bar conductors. The advantage with asymmetric bars, despite the additional manufacturing step, is most significant during high-speed operation where it helps to reduce the AC conductor loss substantially.

Asymmetric Bar Winding: AC Losses.

In this example, a machine with 72 stator slots and 12 rotor poles is considered. Each slot has 4 conductors as shown in FIG. 1B. The heights of the bottom two conductors are decreased by x=20% or $h_1=0.80h$ and the heights of the upper two conductors are increased by x=20% or $h_2=1.20h$ according to the disclosed concept. The AC resistance factor of each layer (L1 to L4) following Eqns. (2)-(5) as a function of speed for both symmetric and asymmetric winding is illustrated in FIG. 2, which shows the analytical results for the layer wise AC resistance factor ($R_{ac}/R_{dc}$) of a symmetric bar winding (FIG. 1A) and an asymmetric bar winding (FIG. 1B).

It is evident that the AC resistance factor is reduced to 5.7 from 10.5 for L4, to 3.3 from 5.8 for L3, increased to 4.3 from 2.9 for L2 and remained the same for L1 at the maximum operating speed (15,000 rpm) using the disclosed methodology. Hence, the average AC resistance factor of the machine is reduced by 27.5% compared to the symmetric winding. Therefore, the disclosed method can significantly reduce the total conductor loss. However, it is not possible to reduce the height of all the conductors after a certain limit without affecting the average torque and core loss. In the symmetric bar design, any reduction of height below an optimized height means that the slot and teeth are redesigned to keep the current density and DC resistance unchanged. This will otherwise have a negative impact on average torque, core loss, and efficiency. The loss analysis, height optimization, manufacturing challenges, winding diagram, and thermal performance will be discussed below.

Finite Element Analysis Model

The FEA model was developed in Altair Flux 2-D. One-sixth of the machine was modeled to reduce the computational burden. FIG. 3 is a schematic diagram illustrating an example of a FEA machine model for a 100 kW, 72 slot (72S), 12 pole (12P) interior PM (IPM) machine. FIG. 4A is an electrical equivalent circuit model including the winding connections. The equivalent circuit model includes details of each conductor and end winding connection in the FEA machine model. This equivalent circuit model in Flux 2-D allows access to each of the conductors to extract the total losses (summation of DC and AC conductor loss). The simulation can be run with current fed sinusoidal sources and does not consider switching ripple due to PWM. The excitation angle can be varied from 0° to 90° with different armature current to extract losses at different speeds. The modeling of the material, conductors, and loss extraction are described below:

PM: PM excitation can be added as a linear magnet having $B_r$ and $\mu_r$ operating at 100° C. which matches the B=f(H) properties provided by the manufacturer.

Core Material: Electrical steel can be considered with non-linear B-H data provided by the manufacturer and imported into the FEA model.

Conductors: Conductors are modeled to correctly estimate the total conductor losses (summation of AC and DC conductor loss) while following the size, shape, and position of the conductors (see FIG. 3). Insulation space can also be incorporated and modeled to account for the effect of the flux linkage and losses. Meshing in each conductor can be carefully monitored at the conductor edges to properly model the skin effect on the conductors. Joule loss (i.e., total conductor loss: summation of AC and DC conductor loss) can be extracted over an electric cycle for all the conductors to get the total losses in the stator winding using the Joule loss sensor. The end winding resistance (i.e., fixed DC resistance) and inductance can also be considered and added in the FEA model. End winding resistance and inductance can be estimated using Altair Flux-Motor software.

Core Loss: The core loss is a limiting factor for designing high-speed machines where it depends directly on magnetic flux density and operating frequency. Core loss can be calculated from the functional core loss data obtained by the Steinmetz equations, which comprise hysteresis loss, eddy current loss, and anomalous loss.

$$P = k_h f B^2 + k_e f^2 B^2 + k_{ex} f^{1.5} B^{1.5} \quad (7)$$

Here $k_h$, $k_e$, $k_{ex}$ are hysteresis, eddy, and anomalous loss coefficients, respectively. These coefficients can be obtained using a curve-fitting method based on core loss data provided by the manufacturer. The core loss can be extracted using FEA based on Bertotti loss model as in Eqn. (7).

Aymmetrtic Bar Winding: Performance Analysis

A 100 kW, 72S/12P, 15,000 rpm IPM machine with a double V-shape magnet in rotor and bar wound stator with 4-conductors/slot suitable for traction application is designed as shown in FIG. 3 to validate the effectiveness of the proposed asymmetric bar winding. Design specifications are provided in the table of FIG. 4B. The specific slot/pole combination was chosen following the industry trend. Various EV machines have maximum speeds in the vicinity of 11,000-15,000 rpm for 12 pole or 8 pole machines. Design with bar conductors have been introduced with the maximum speed below 10,000 rpm. While the 4-conductors/slot design was chosen for analysis, the disclosed concept is also applicable for any even number of conductors/slot such as, e.g., 6-conductors/slot, 8-conductors/slot and so on.

Figure 5A:
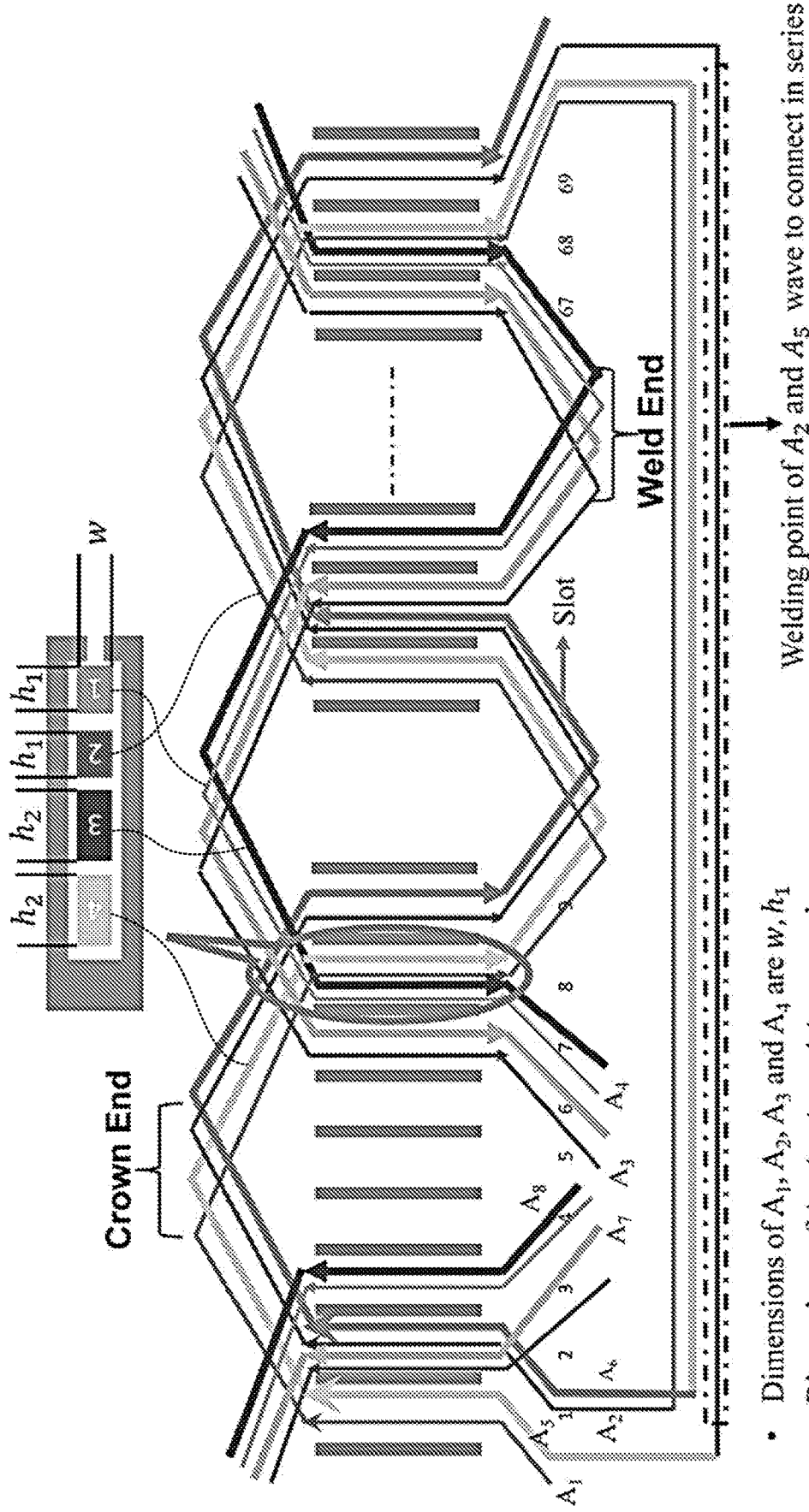
FIG. 5A is a schematic diagram illustrating an example of an asymmetric bar phase winding layout, in accordance with various embodiments of the present disclosure.

Winding Layout. The winding layout of a bar-wound motor has wave-winding construction whereas lap winding is typically used for the stranded design. Hairpin construction is formed outside and later inserted into the slot. Conductor ends can be twisted to form the frog-leg-type shapes, which are then welded together in the end connection to create the wave winding as illustrated in FIG. 5A. In this analysis, two parallel paths are considered in the stator to meet the voltage and current as set in the table of FIG. 4B, and the asymmetric bar winding layout is shown in FIG. 5A. This winding layout was chosen such that other phase conductors can share the slots after every alternate slot. The ac losses are minimum when different phase conductors share a slot and maximum when the same phase conductors share a slot.

Figure 5B:
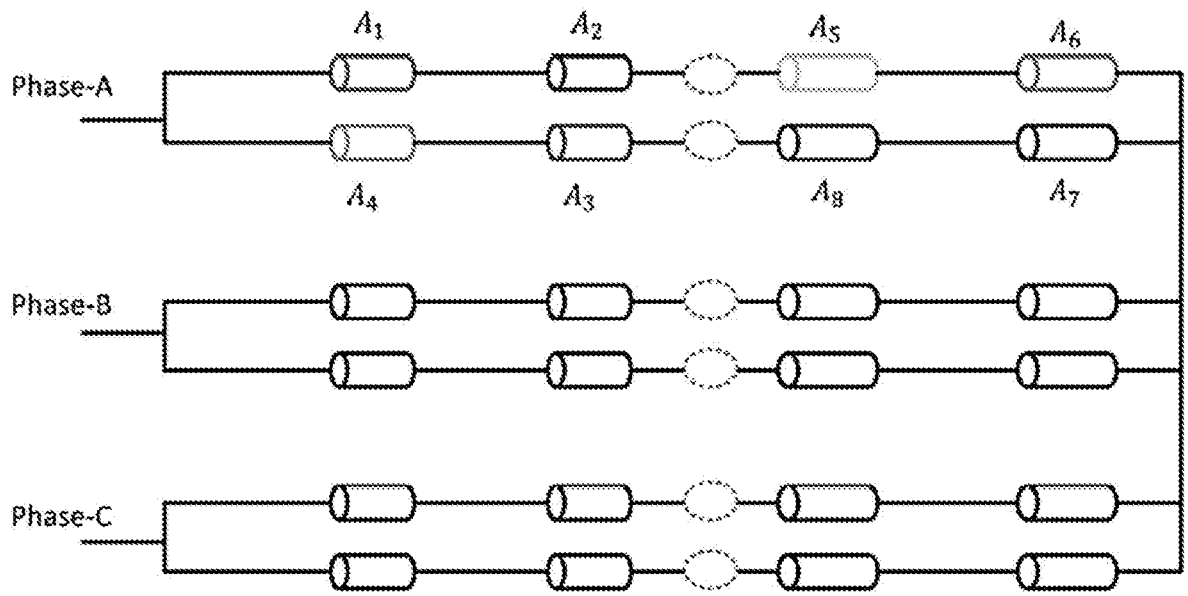
FIG. 5B is a schematic diagram illustrating an example of an electrical equivalent circuit model of the phase winding of FIG. 5A, in accordance with various embodiments of the present disclosure.

In a bar/hairpin winding, conductors are at different positions in the slot and as a result, there will be potential differences among the bars. This creates the possibility of circulating currents through the parallel paths. Coil groups can be carefully sorted while forming the parallel paths to reduce the possibility of the circulating current. In the winding layout of FIG. 5A, coils $A_1 \rightarrow A_2 \rightarrow A_5 \rightarrow A_6$ are in the parallel path 1 and $A_3 \rightarrow A_4 \rightarrow A_7 \rightarrow A_8$ are in parallel path 2. The electrical equivalent circuit model connection is shown in FIG. 5B. The circulating current between path 1 and path 2 is zero since both the paths have conductors at the same relative position in the slot.

Figure 5C:
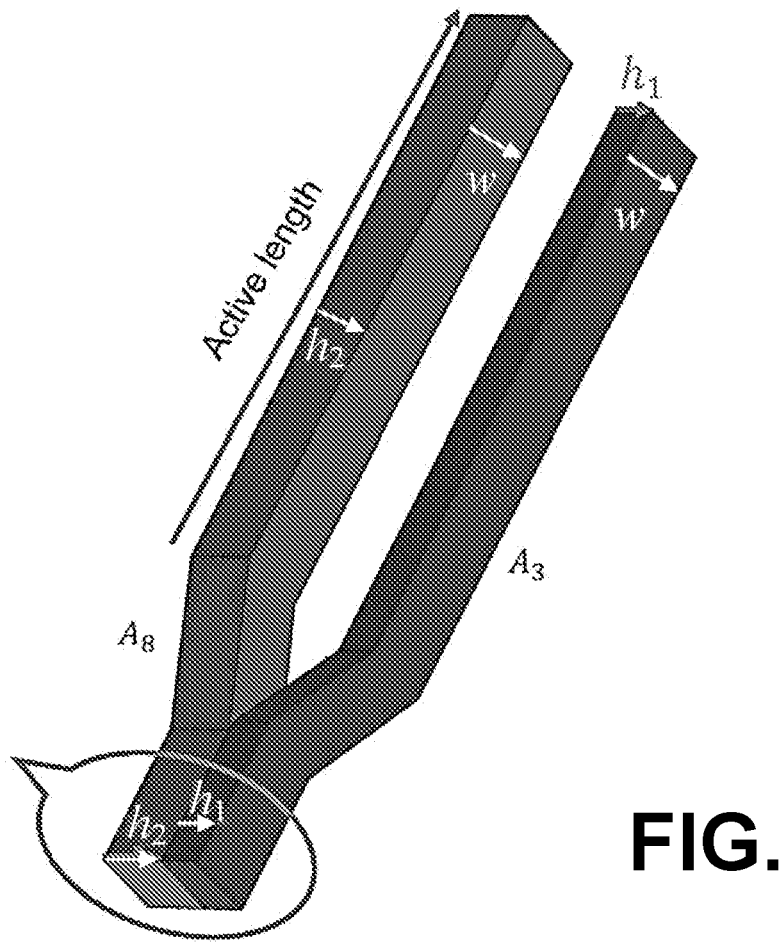
FIG. 5C illustrates welding of two bar conductors having different cross-sectional areas, in accordance with various embodiments of the present disclosure.
Figure 6A:
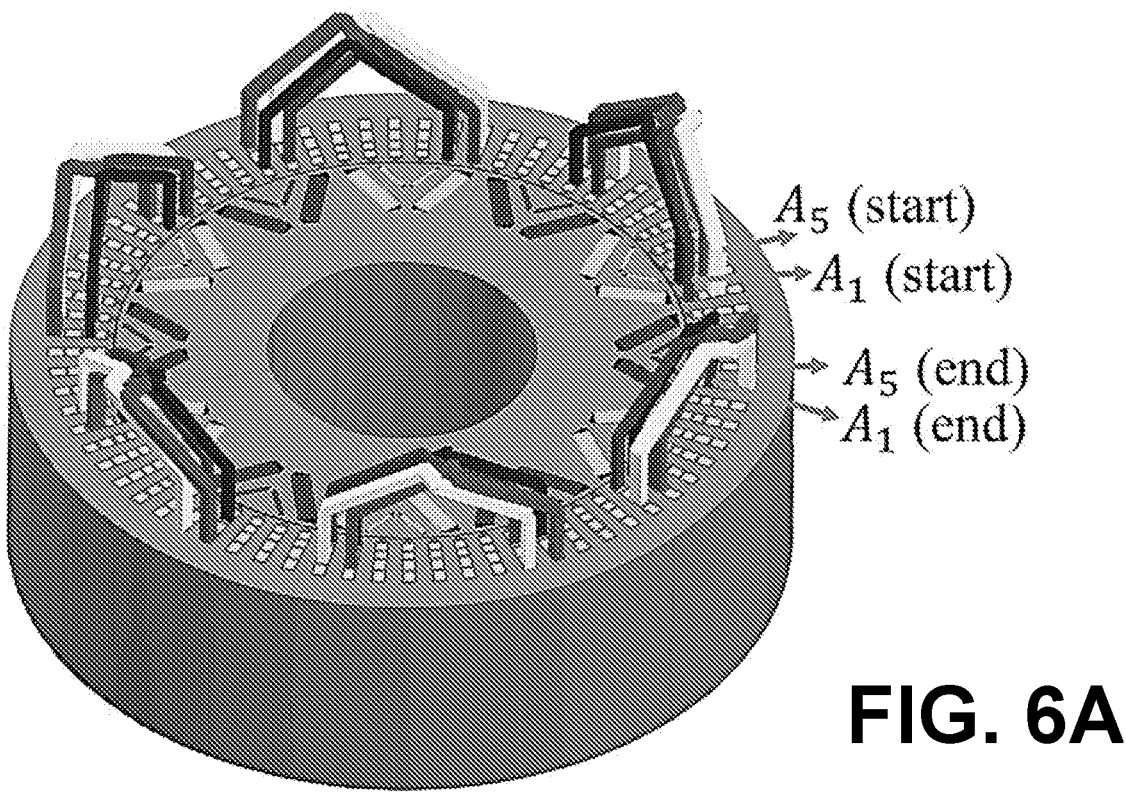
FIGS. 6A and 6B are perspective views illustrating examples of asymmetric and symmetric bar winding layout, in accordance with various embodiments of the present disclosure.
Figure 6B:
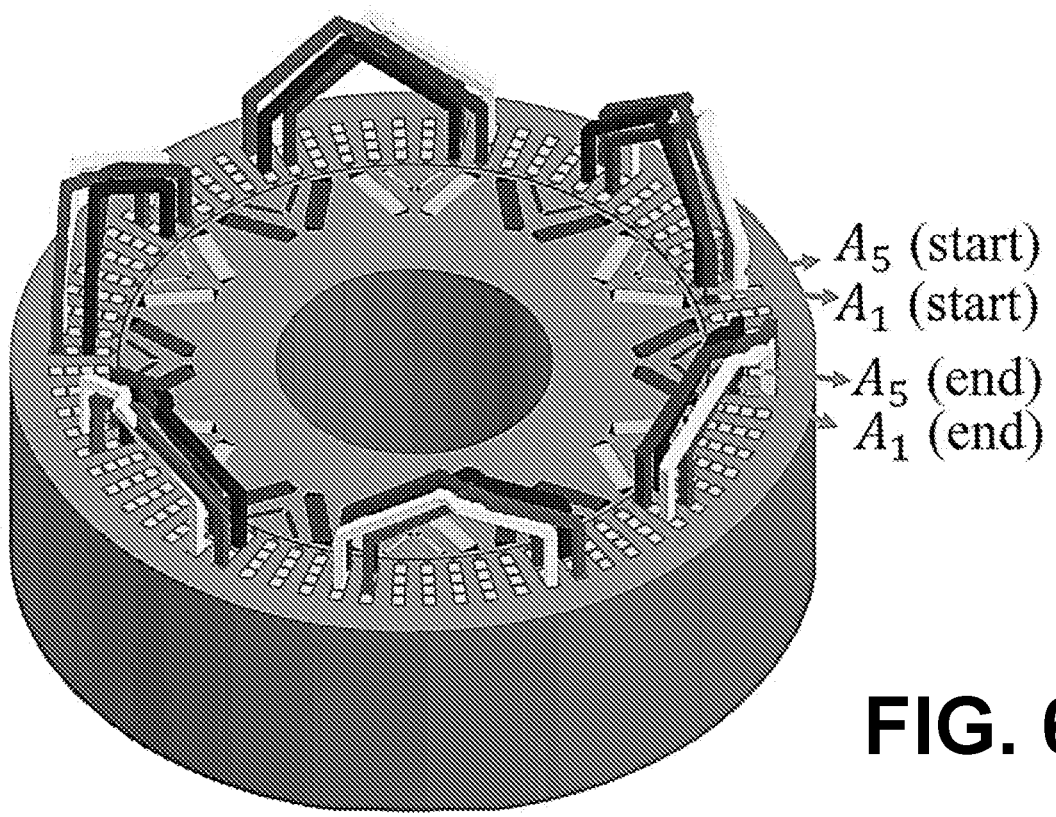

However, in the hairpin/bar wound machine all the coils travel 0° to 360° in a wave pattern and are welded at the end of the wave to form a series connection as illustrated in FIGS. 5A and 5B. FIG. 5C illustrates the welding connection between two conductors having different cross-sectional areas. 3-D illustrations of $A_1$, $A_2$, $A_5$, $A_6$ coils are shown in FIGS. 6A and 6B. The disclosed asymmetric winding layout is depicted in FIG. 6A and the symmetric/conventional winding layout is shown in FIG. 6B. It can be seen from FIG. 6A that the cross-sectional area is the same from start to end for a single wave (wave/coil $A_1$, $A_2$, $A_5$, $A_6$). In FIGS. 5A-6B, $A_1$, $A_2$, $A_3$ and $A_4$ have the cross-sectional area of w·$h_1$ and $A_5$, $A_6$, $A_7$ and $A_8$ have the cross-sectional area of w·$h_2$ for the asymmetric concept whereas in case of the symmetric winding all the conductors have cross-sectional area of w·h. Therefore, there will be only two sizes of bar conductors in the stator for the asymmetric winding.

However, depending on the voltage and current rating of the machine, different coils/waves may be used to connect the coils in series or parallel. In doing that, welding can be used to connect conductors of the different cross-sectional areas as illustrated in FIG. 5C. In this analysis, the winding was optimized in such a way that there will be only two welding points in each phase where conductors of different cross-sectional areas are welded. As a result, the disclosed winding concept does not add any complexity, since the total number of welding, connections, hairpin number, copper volume are the same as in a symmetric/conventional winding.

Figure 7C:
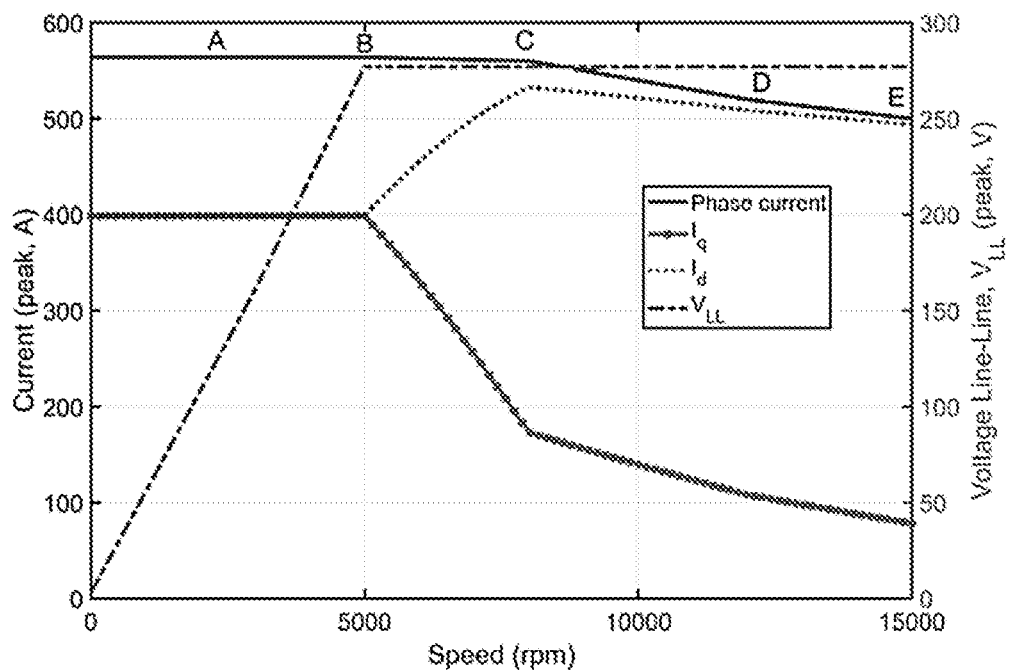

Symmetric/Conventional Bar Winding: Loss Analysis. Another machine was designed with conventional symmetric bars to meet the peak power and torque within the given magnetic loading, electrical loading, and dimensional constraints. Parameters for both the symmetric and asymmetric bar wound machines are presented in the table of FIG. 7A. The torque-speed and power-speed profiles are given in FIG. 7B using field-oriented control, and the corresponding phase current at different operating speeds are shown in FIG. 7C.

Figure 8A:
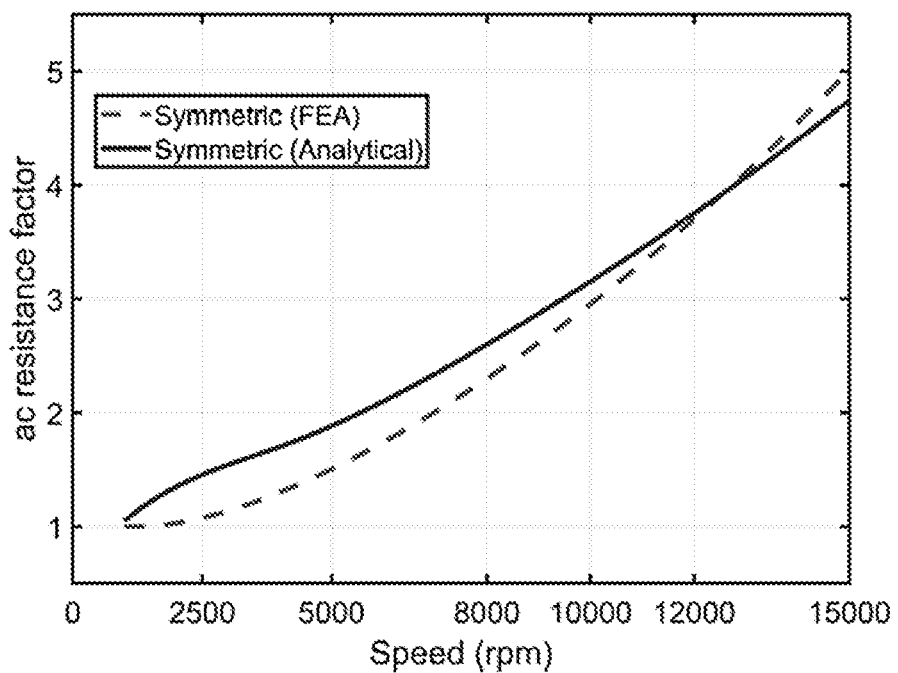
FIGS. 8A and 8B illustrate comparisons of the average AC resistance factor of symmetric and asymmetric windings, in accordance with various embodiments of the present disclosure.
Figure 8B:
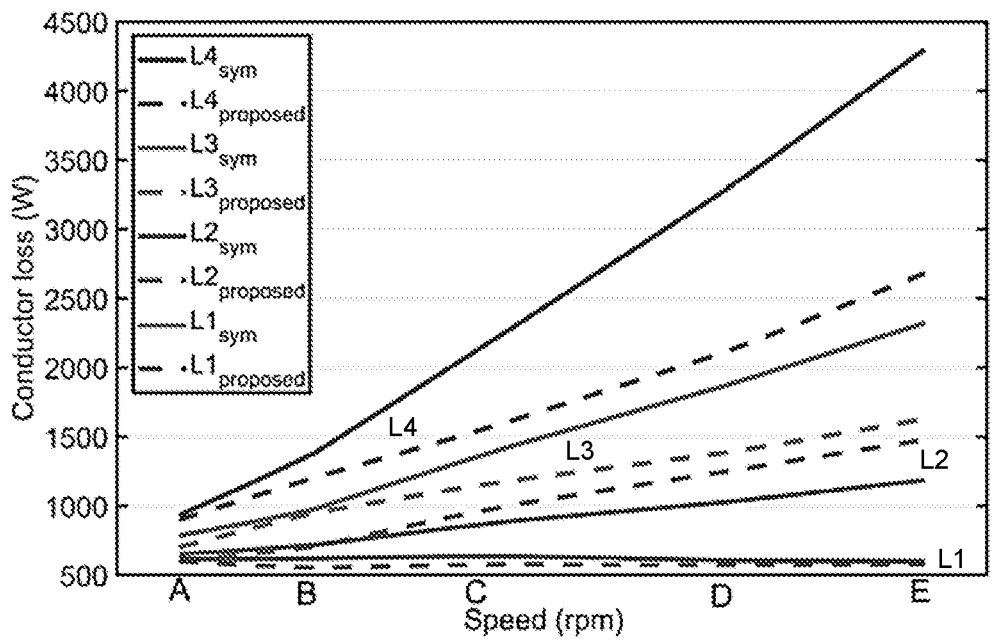

The joule losses (i.e., total conductor loss: summation of AC and DC conductor loss) in the conductors were extracted using the developed FEA model. The operating temperature of the windings is set at 100° C. To validate the FEA model, average AC loss factor $R_{ac}/R_{dc}$ is compared with the analytical model for the entire speed range. FIG. 8A illustrates a comparison of the average AC resistance factor ($R_{ac}/R_{dc}$) of the symmetric winding between FEA and analytical results, and FIG. 8B illustrates the FEA extracted layer-wise conductor loss of symmetric and asymmetric windings at the A, B, C, D and E operating points of the torque-speed profile of FIG. 7B. The results shown in FIG. 8A indicate a clear trend match between the FEA and the analytical model. However, the FEA model includes the non-linear properties of lamination materials and local saturation.

The layer-wise conductor losses (summation of both DC and AC) at A, B, C, D, and E operating points of the torque-speed curve (FIG. 7B) are shown in FIG. 8B. Conductor L4 contributes 932 W (31%) and 4,300 W (51%), L3 contributes 784 W (26%) and 2,321 W (28%), L2 contributes 647 W (22%) and 1,135 W (14%), and L1 contributes 614 W (21%) and 597 W (7%) of the total losses at point A and E, respectively. Therefore, it is evident that when the AC losses are dominant, they are distributed unevenly. It can be concluded that the conductors close to the air gap will have a higher operating temperature at any operating point of the torque-speed curve, and therefore are susceptible to thermal hot spots. However, conductors (close to yoke) loss is approximately insensitive to the operating speed of the machine. Hence, it can be concluded that the proximity effect is the dominant one compared to the skin effect. Therefore, any reduction of losses of the conductors ($L_4$) close to airgap will substantially improve the performance of the bar wound machine.

Asymmetric Bar Winding: Design and Optimization. The presented asymmetric bar conductor design helps make the loss distribution more even compared to the regular design. According to the asymmetric bar concept, there will be two layers with reduced height ($L_4$ and $L_3$) as shown in FIG. 1B. Height reduction can be accomplished such that the average current density in the asymmetric bar conductor does not exceed the symmetric bar conductor density by more than 5%. If the average current density using the disclosed concept exceeds the symmetric design by a higher margin, then the low-speed performance will degrade where the AC loss is negligible. The FEA based optimization criteria with a single objective of total conductor loss (i.e., summation of AC and DC conductor loss) minimization, subject to the RMS current density constraints, can be defined as follows:

$$\text{Min}(C_{loss}) = f(X), \quad (8)$$

where x=height reduction in $L_4,L_3$ or increase in $L_1, L_2$. Subject to the constraints: $J_{rms}(L_4, L_3) \leq 34$ A/mm², $J_{rms}(L_1, L_2) \leq 18$ A/mm².

Figure 9A:
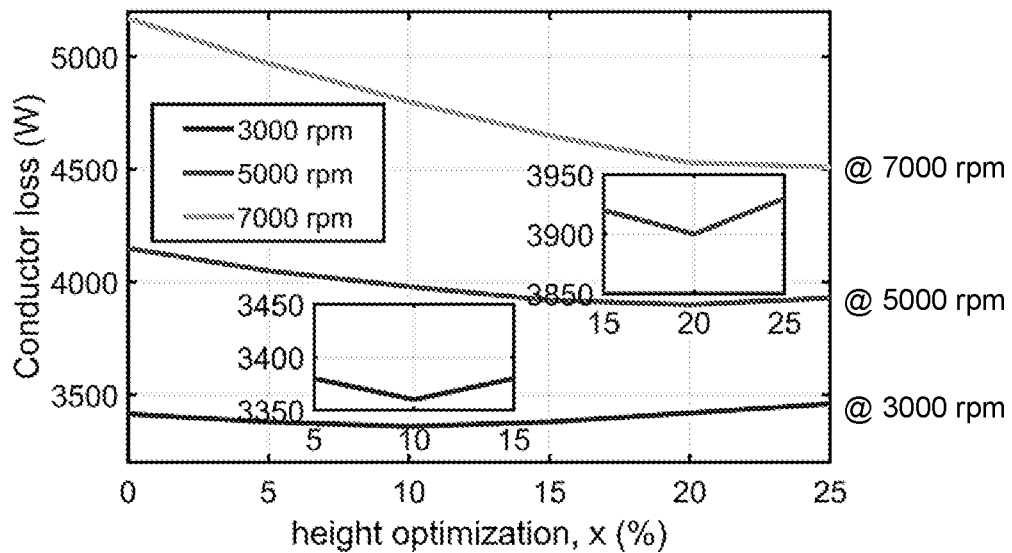
FIGS. 9A and 9B illustrate examples of height optimization for an asymmetric winding, and average AC resistance factors, in accordance with various embodiments of the present disclosure.

FEA based optimization on conductor heights to minimize the conductor loss at different speeds (e.g., 3000, 5000, and 7,000 rpm) for the asymmetric winding are shown in FIG. 9A. The minimum conductor loss for 3,000 rpm is at 10% height reduction, for 5,000 rpm it is at 20%, and for 7,000 rpm it is at 25%, where 0% indicates the loss for the symmetric design. As the AC loss is inversely proportional to the height of the conductors, the asymmetric bar concept reduces the total loss by a substantial amount. AC loss can also be a strong function of the position of the conductors, which is why the loss reduction of the conductors close to the air gap is much higher compared to the loss increase of the conductors away from the air gap. In this analysis, conductor loss can be minimized at the rated speed given that $C_{loss\text{-}Asymmetric} \leq C_{loss\text{-}symmetric}$ at 3,000 rpm. This is because most of the operating points in traction applications are generally close to the base speed. Therefore, in this analysis, the optimized x is selected as 20%, which reduces the conductor loss at 7,000 rpm by 680 W and at 5,000 rpm by 250 W. This will result in a cooler stator with the asymmetric bar design compared to the conventional symmetric bar design. However, the designer can select the desired speed where conductor loss minimization is the most beneficial depending on the application or driving cycle analysis.

Figure 9B:
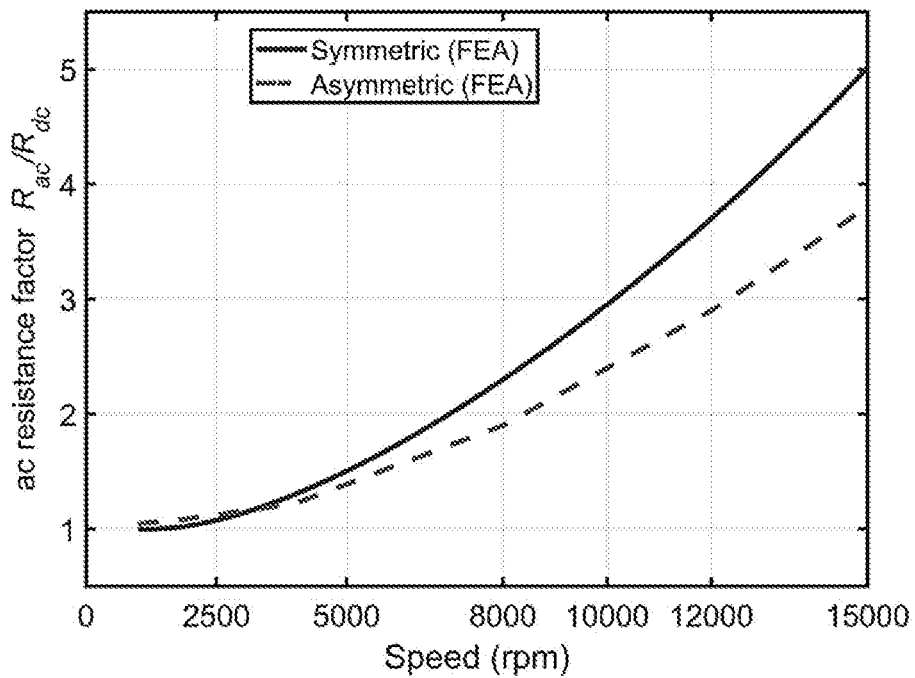
Figure 10:
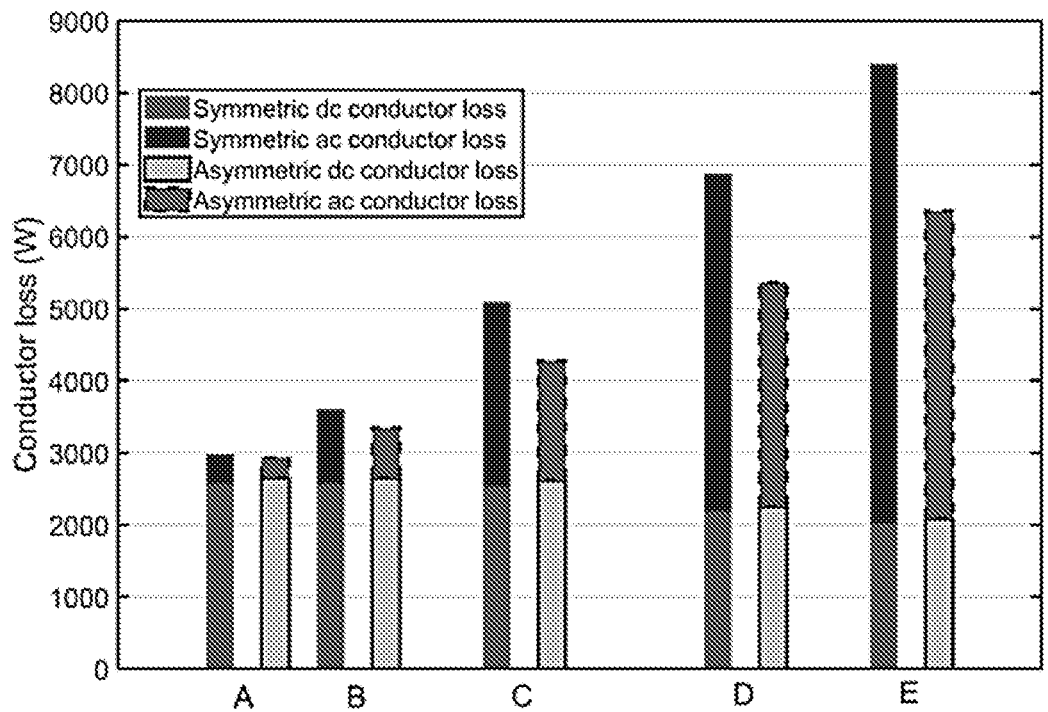
FIG. 10 illustrates examples of conductor loss at different operating points of the torque-speed curve of FIG. 7B, in accordance with various embodiments of the present disclosure.

Comparative Electromagnetic Performances: Symmetric and Asymmetric Bar Winding. The optimized height reduction (x=20%) is used to compare the performance of asymmetric concept with the symmetric design. The comparison of an FEA extracted average AC resistance factor, $R_{ac}/R_{dc}$ between the symmetric and asymmetric designs is shown in FIG. 9B. The improvement in the average AC resistance factor is approximately 30% at the maximum operating speed (15,000 rpm). The reduction in $R_{ac}/R_{dc}$ is evident in the operating range from 2,500 rpm to the maximum speed. The other advantage of the proposed concept is the uniformity of loss distribution. Layer-wise loss distribution is shown in FIG. 8C for A, B, C, D, and E operating points of the torque-speed curve (FIG. 7B). At point E, the total loss reduction is 2,041 W where $L_4, L_3, L_2, L_1$ contributes 2,680 W (42%), 1,627 W (26%), 1,477 W (23%), 577 W (9%) of total loss compared to 4,300 W (51%), 2,321 W (28%), 1,185 W (14%), 597 (7%) of symmetric bar conductor design. Moreover, the trend of more even loss distribution along with loss reduction is true at any current level using the asymmetric bar winding. The REA extracted DC and AC conductor loss for both the designs at the different operating points of the torque-speed curve (FIG. 7B) are shown in FIG. 10. It can be seen that the disclosed concept has substantially reduced the AC conductor loss.

The advantage of the disclosed asymmetric winding concept is two-fold; loss reduction will improve the efficiency of the motor and even distribution of loss among the layers will improve the thermal performance. The thermal path for the conductors close to the yoke (back-iron) is shorter, and the conductors closer to the air gap are longer. Even though the asymmetric bar concept increases the AC losses in the conductors away from the air gap, the higher cross-sectional area with the shorter thermal path will reduce the temperature of those conductors compared to the symmetric case. The reduction of losses of the conductors close to the air gap will reduce the risk of thermal hot spots. Hence, there will be an overall maximum temperature reduction at each operating point beyond the base speed of the motor. This will lead to an improvement in the continuous output power of the motor.

Figures 11A, 11B:
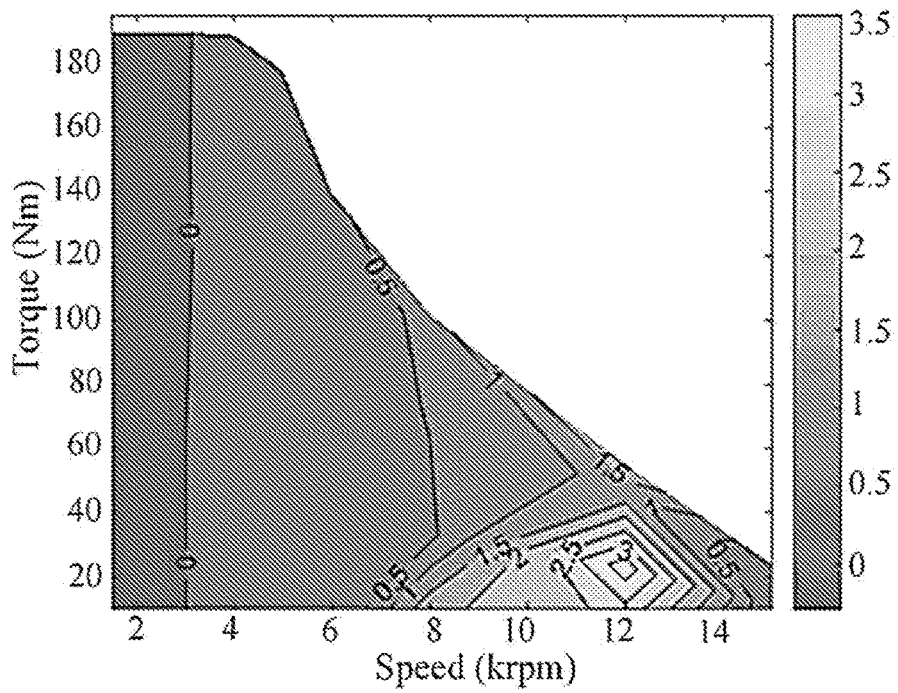
FIGS. 11A and 11B illustrate examples of symmetric and asymmetric winding design loss components, in accordance with various embodiments of the present disclosure.

The asymmetric bar method can extend the maximum efficiency range and improve the overall efficiency throughout the operating range beyond the base speed. Both conductor and core losses are considered in calculating efficiency. The magnet eddy current loss is not considered, as it will be negligible and the same for both the symmetric and asymmetric designs. The efficiency can be calculated using:

$$\eta = \frac{P_{out}}{P_{out} + P_{conductor} + P_{core}}, \quad (9)$$

where $P_{out}, P_{conductor}, P_{core}$ are output power, total conductor loss (summation of DC and AC conductor loss), and core loss, respectively. Different loss components at base speed are summarized in the table of FIG. 11A. The results show that the asymmetric bar and symmetric bar designs have the same core loss which is because the teeth width, slot dimensions, magnetic loading, and electrical loading are the same for both the designs. The difference in efficiency between the symmetric and asymmetric bar designs is illustrated in FIG. 11B. Above 8,000 rpm, efficiency improvement is greater than 3%. The improvement in efficiency may be attributed to the reduction of the stator conductor's AC loss as the core loss is the same for both designs. The substantial improvement in the efficiency of the motor can translate to improved fuel economy in EV or HEV applications. Though the improvement in efficiency is only 3%, the substantial improvement of continuous output power for the same cooling effort can be a significant advantage.

Comparative Thermal Performances: Symmetric and Asymmetric Winding. To compare the thermal performance of the asymmetric bar concept with a conventional symmetric design, a spiral water jacket cooling system was considered with ethylene water-glycol mixture being used as the heat extraction fluid. The inlet temperature of the fluid was considered as 65° C. The suitable fluid flow rate for the cooling system was identified through an iterative calculation and selected to be 10 liter/min for the water jacket cooling system. The thermal properties of the materials inside the designed machine were obtained from literature. Heat distribution inside the machine is a function of the convection heat transfer coefficient due to the forced cooling, loss modeling, and contact resistances. A convective boundary condition was added at the outer periphery of the stator to incorporate the cooling effect due to forced cooling in thermal FEA. Heat flow in the axial direction through the shaft was considered using a virtual convective boundary condition. All the losses were eventually dissipated by the convective boundaries. The convective heat transfer coefficient was obtained using:

$$h_c = \frac{kNa}{d}, \tag{10}$$

where the Nusselt number is:

$$N_u = 0.023 * R_e^{0.8} P_r^{0.35}, \tag{11}$$

k is thermal conductivity, d is the hydraulic diameter, $R_e = vd/\mu_r = (c_p\mu)/k$, v is fluid velocity, $\mu$ is the dynamic viscosity of the fluid, and $c_p$ is the specific heat of the fluid.

The following assumptions may be made to simplify the comparative thermal analysis:
1) Heat radiation inside the machine can be ignored.
2) Losses are distributed uniformly inside the heating parts of the machine.
3) Symmetric and asymmetric bar windings have the same cooling system and condition; and both designs have the same thermal model.
4) The airgap fluid flow can be replaced by an equivalent solid layer since only conduction heat flow is possible in FE software.

Figure 12A:
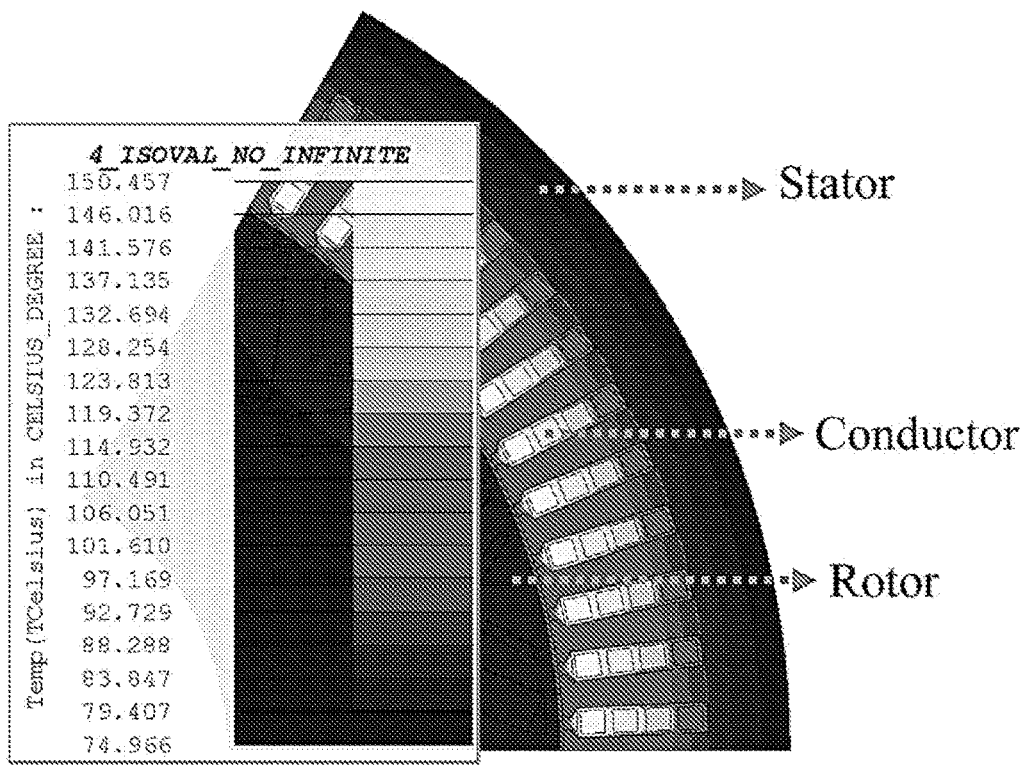
Figure 12B:
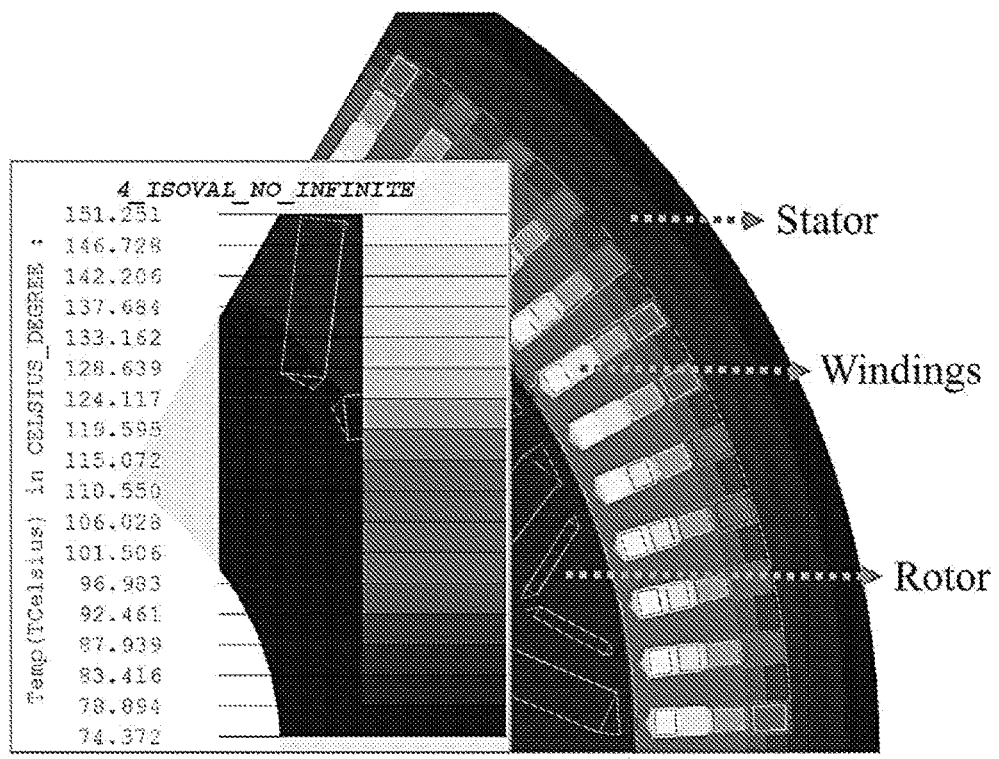
Figure 13A:
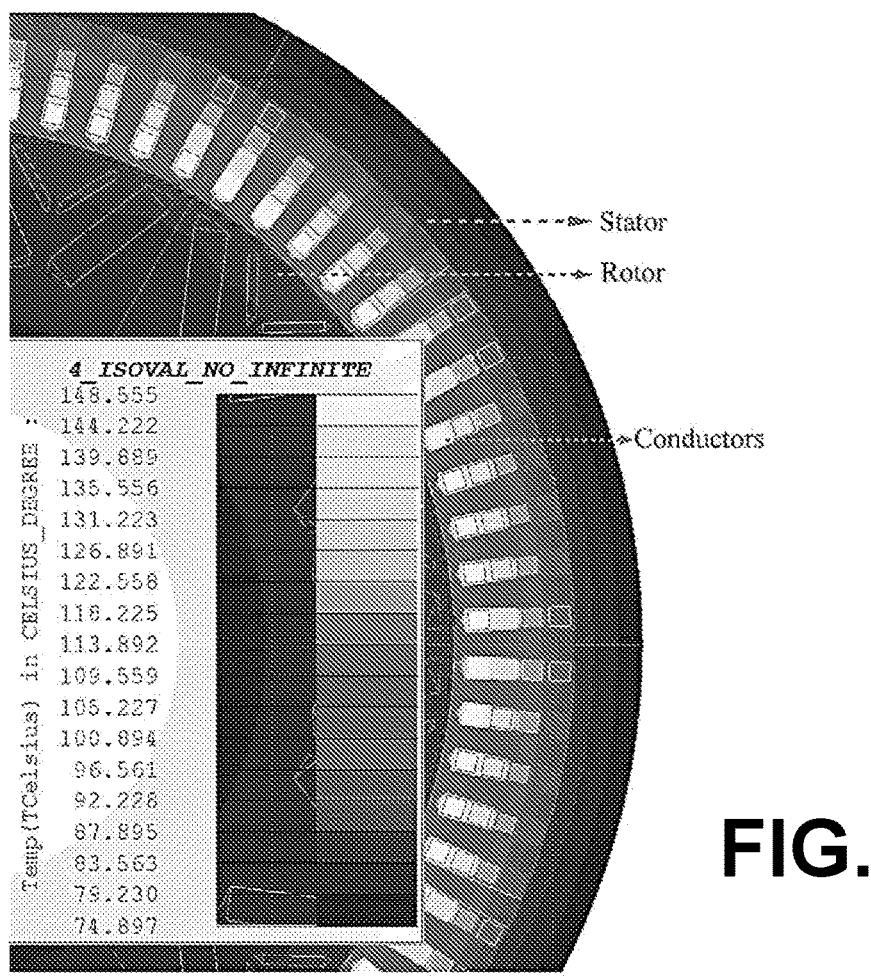
Figure 13B:
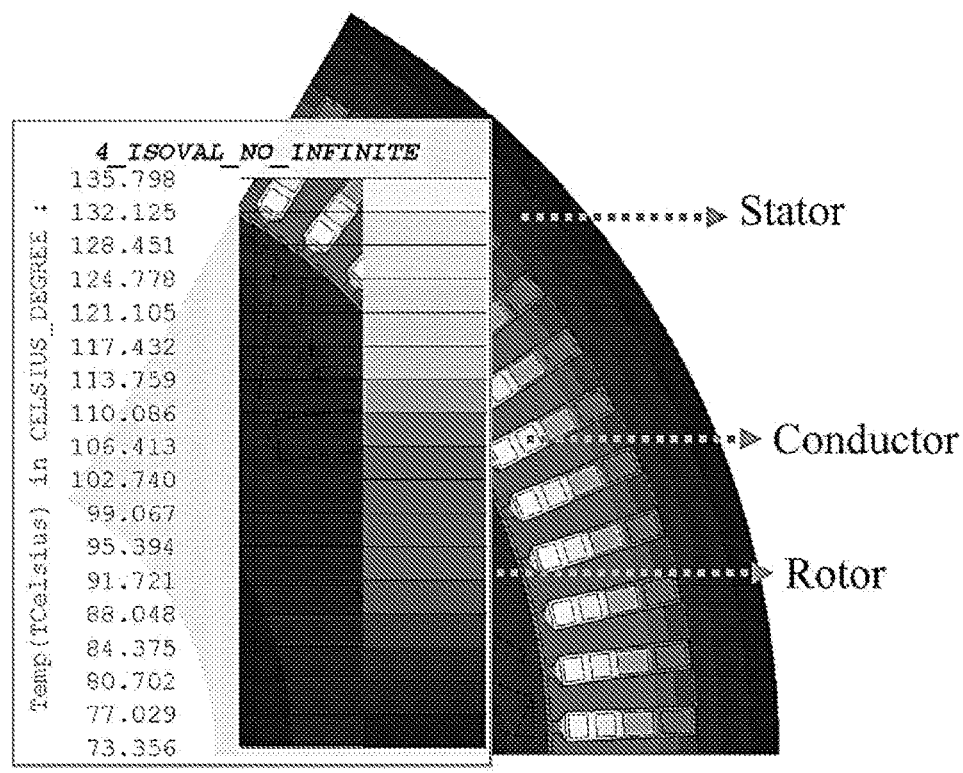
Figure 14A:
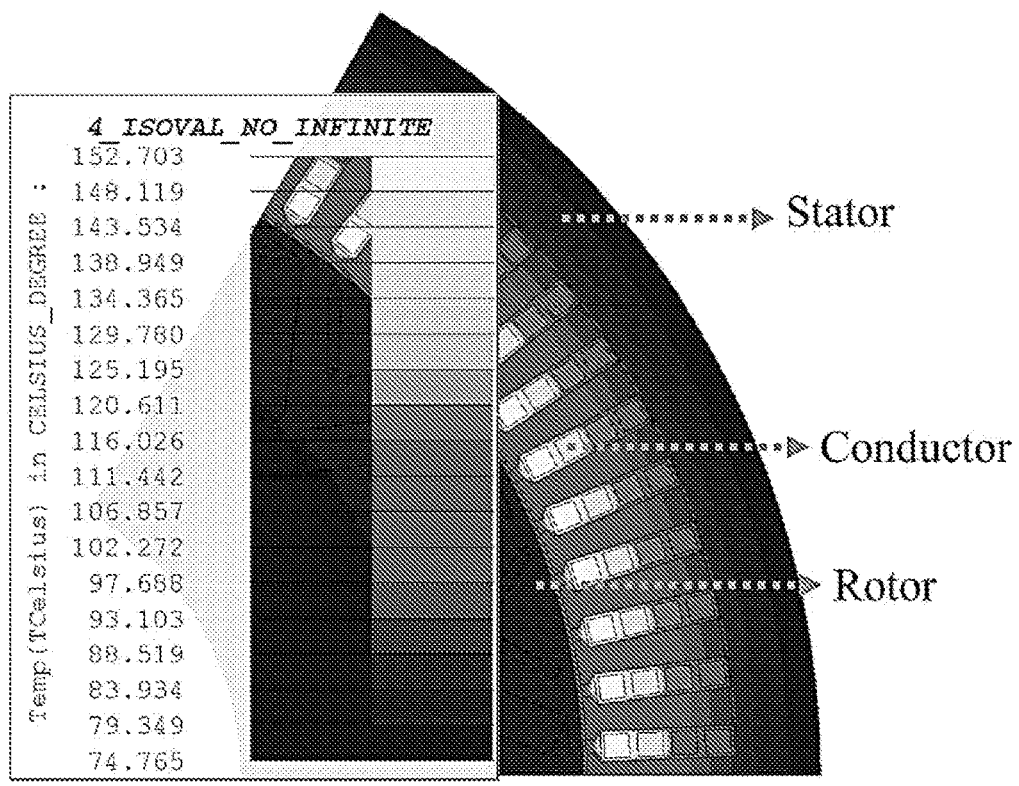
Figure 14B:
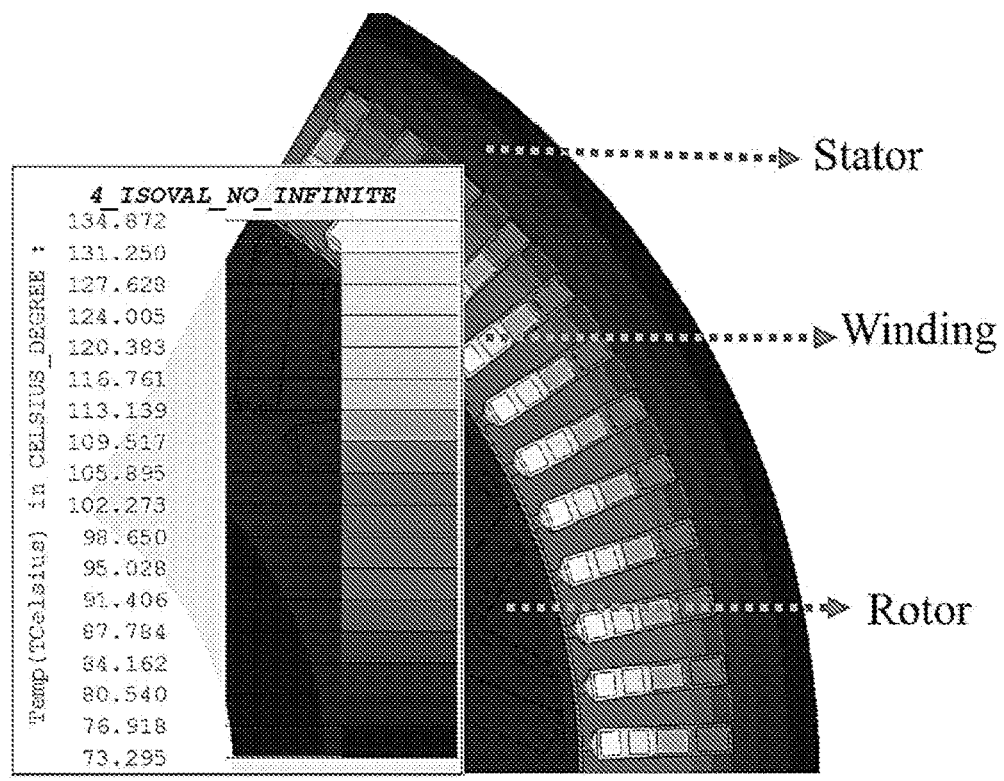

Thermal analysis can illustrate relative performance variations of the designs with the same cooling effort. Steady-state temperature distribution inside the machine can be extracted using the thermal FEA at different operating speeds as presented in FIGS. 12A, 12B, 13A, 13B, 14A and 14B. FIGS. 12A and 12B illustrate the steady-state temperature distribution for the symmetric winding and asymmetric winding, respectively, at a torque of 112 Nm ($I_q$=276 A, $I_d$=231 A). FIGS. 13A and 13B illustrate the steady-state temperature distribution for the symmetric winding and asymmetric winding, respectively, at a torque of 75 Nm ($I_q$=140 A, $I_d$=242 A). FIGS. 14A and 14B illustrate the steady-state temperature distribution for the symmetric winding and asymmetric winding, respectively, at a torque of 12 Nm ($I_q$=35 A, $I_d$=218 A). It can be seen that the conductors have the highest temperature regardless of the operating speed.

Figure 12C:
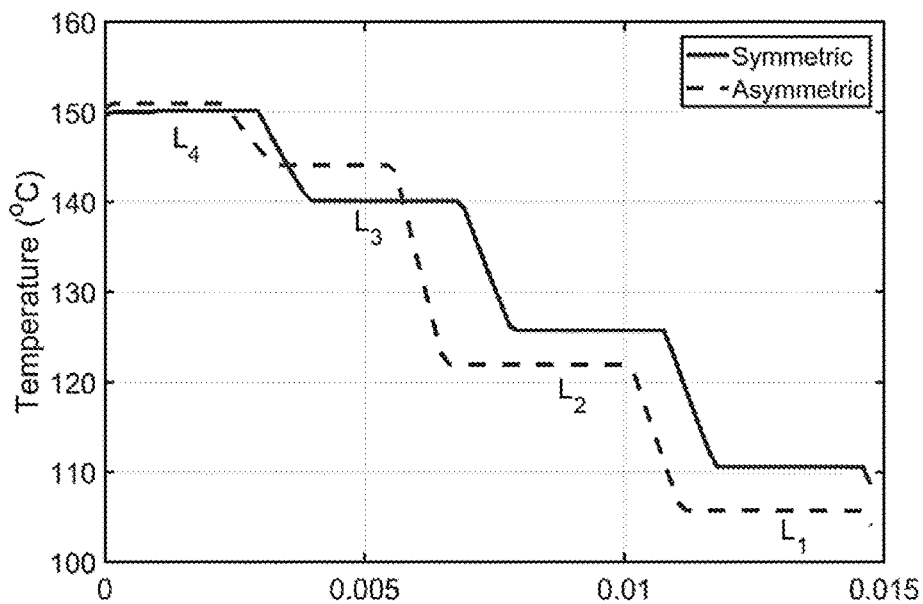
Figure 13C:
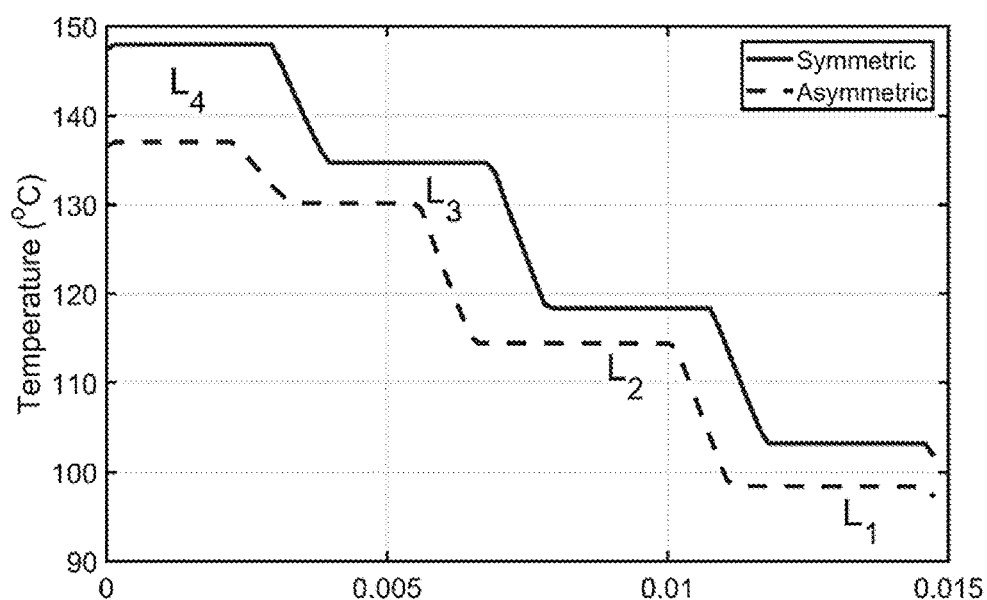
Figure 14C:
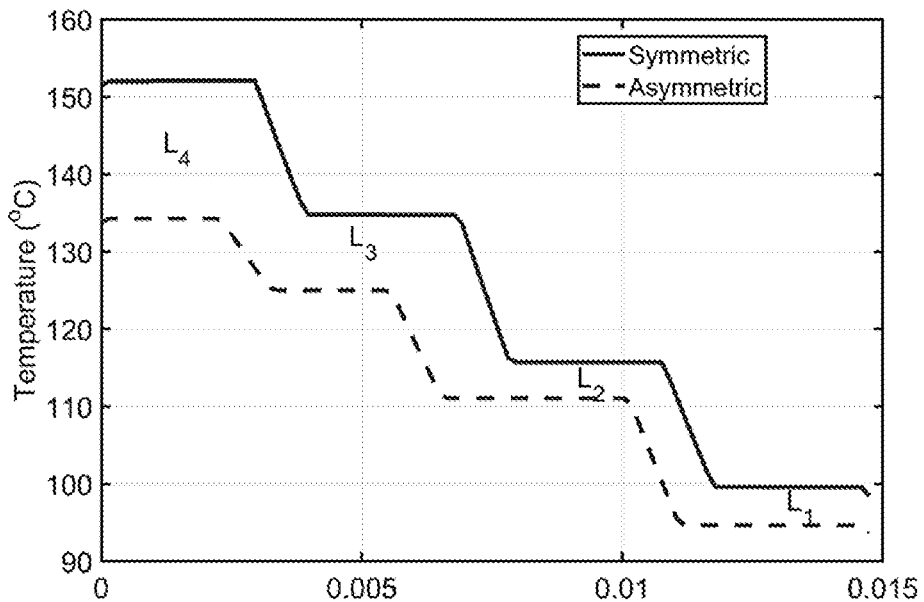

The conductors closest to the air gap have the highest (or maximum) operating temperature and the conductors at the slot end region have a lower (or minimum) temperature. Therefore, the output power of the bar wound machine may be limited due to the hot spot in the conductors closest to the airgap ($L_4$ of FIG. 1B). Hence, any temperature/loss reduction of $L_4$ can directly increase the output power capability of the machine. Therefore, thermal performance has been compared between the asymmetric bar design and conventional symmetric design. FIGS. 12C, 13C and 14C illustrate the steady-state temperature at different conductor layers ($L_4$, $L_3$, $L_2$, $L_1$) for the symmetric winding and asymmetric winding at the torques of 112 Nm, 75 Nm, and 12 Nm, respectively. For the same operating condition, the asymmetric bar winding can substantially reduce the temperature of the $L_4$ conductors due to the reduction of AC conductor loss, which is true for any operating speed beyond the base speed. The asymmetric concept has the same maximum temperature at the base speed even though it has a lower loss compared to the symmetric design due to the reduction of the heat dissipation area. Overall, the thermal behavior allows substantial improvement in the disclosed asymmetric bar design concept.

Figure 15A:
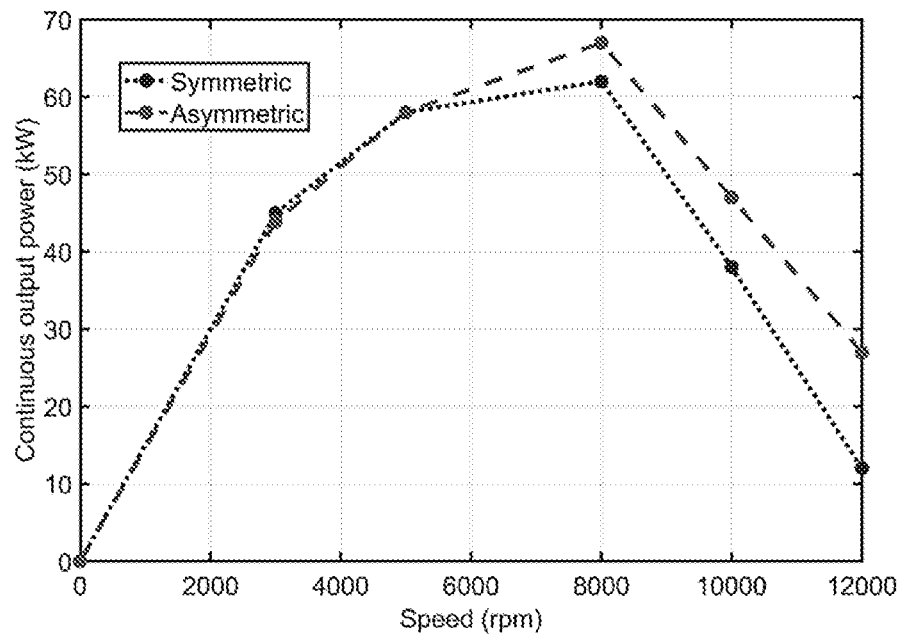
FIG. 15A illustrates an example of continuous output power of symmetric and asymmetric windings, in accordance with various embodiments of the present disclosure.

For continuous operation, stator temperature can be limited to 150° C., while the magnet temperature can be limited to 140° C., corresponding to an operating range recommended by the magnet manufacturer. FIG. 15A illustrates an example of continuous output power as a function of speed for symmetric and asymmetric bar windings. The output power decreases rapidly at high-speed due to the high AC losses associated with the bar wound machine. However, the asymmetric concept substantially increases the peak continuous output power due to the effectiveness in reducing the AC losses for the same cooling effort. The difference in continuous output power between the symmetric and asymmetric winding increases with speed. The maximum improvement in continuous output power is approximately 15 kW at 12,000 rpm as shown in FIG. 15A. As can be seen, the disclosed concept improves the continuous output power for all the operating speeds beyond the base speed. However, due to the increase of the DC loss and the reduction of the size of the conductor using the asymmetric concept, the low speed (below 3,000 rpm) continuous output power is reduced slightly by 1-2 kW. Therefore, it can be said that to extract the same power as a symmetric bar design, the size of the asymmetric concept machine can be reduced or can be designed with enhanced power density considering the same cooling effort. This is in addition to the benefit that the proposed asymmetric concept can solve the problem associated with a bar wound machine in a high-speed application.

Figure 15B:
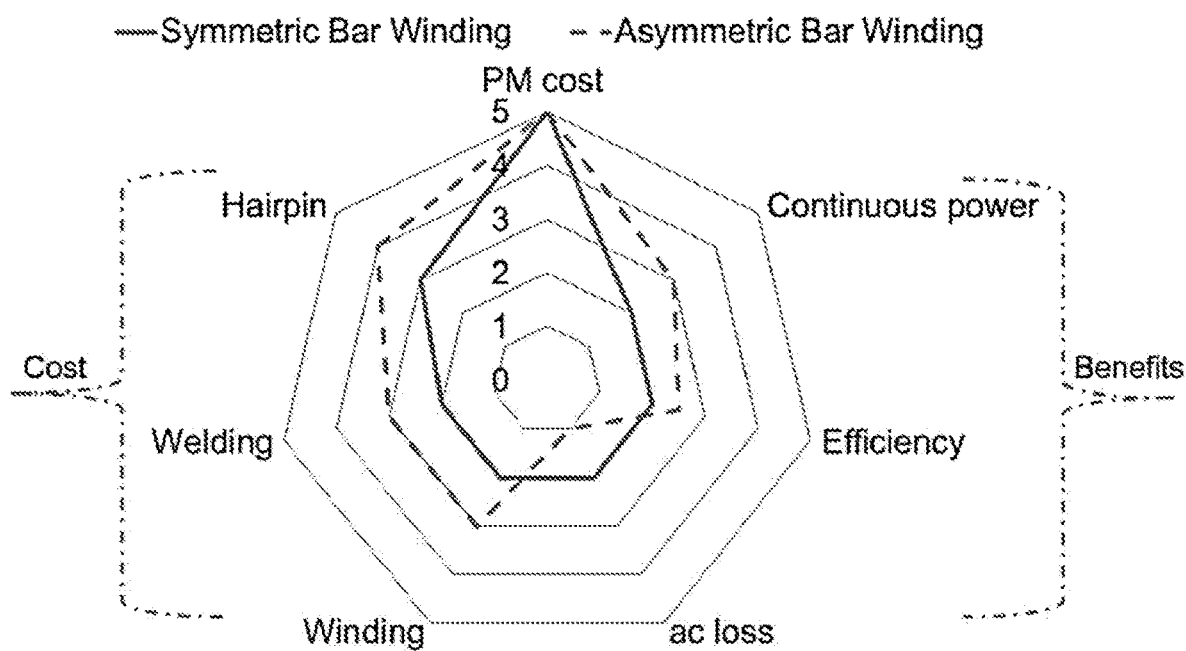
FIG. 15B illustrates an example of a qualitative cost benefit analysis of symmetric and asymmetric windings, in accordance with various embodiments of the present disclosure.

A new bar winding design for the reduction of AC losses of a conventional bar wound machine based on conductor height asymmetry while preserving all the positive features of the bar wound conductors. The root cause for the thermal hot spots in conductors close to the air gap may be attributed to the uneven distribution of conductor loss in the conventional hairpin design. The asymmetric bar concept distributes the AC conductor loss more evenly and at the same time substantially reduces the AC conductor loss. A new winding method has been conceived with asymmetric bars without a significant increase in manufacturing complexity. Application of the asymmetric winding concept in a high-speed IPM machine showed a substantial reduction of AC conductor loss, an improvement in efficiency, and an increase in peak continuous output power for the same cooling effort. As described, an improvement of 15 kW in continuous output power for a 100 kW IPM traction machine was shown. Detailed thermal analysis showed that the winding concept reduces the risk of the thermal hot spot in conductors close to the air gap. These performance improvements open up the feasibility for bar windings in medium to high-speed traction applications. An efficiency improvement of the motor can translate to a higher fuel economy in HEV and BEV applications. A comparative qualitative cost-benefit analysis between symmetric design and asymmetric design is shown in FIG. 15B. The asymmetric bar concept can increase the average torque, continuous output power, and efficiency without adding extra thermal cost in bar wound machines. A higher torque density can be achieved under the same stator conductor loss or a cooler motor can be provided under the same rated power in bar wound machines.

The disclosed asymmetric bar winding design utilizes several bar conductors within each slot, with at least one bar conductor having a different cross-sectional area compared to the others. The total copper area and DC resistance of the asymmetric design will be consistent with symmetric bar winding designs. The concept is applicable to a wide range of rotor topologies (single-V, double-V, delta, spoke, U, etc.), slot-pole combinations, and series or parallel connections, irrespective of the number of layers in the slot. The bar conductors can have square or rectangular cross-sections. The cross-sectional area can be changed by either changing the height, changing the width, or changing both dimensions. The height of the conductor is more sensitive to AC loss (proximity and skin), which can provide a greater design effect. The height of the bar conductors can be reduced to provide a lower surface area, and the height of the other bar conductors can be increased proportionately, while keeping the width the same for all of the conductors. As previously discussed, this method can reduce the total conductor loss while simultaneously increasing the efficiency of the machine. Temperature rise can also be lowered with respect of the symmetric conductor design. In bar wound stators, the teeth of the core are wider away from the rotor and thinner closer to the air gap. Peak torque of the machine can be reduced substantially because of the higher saturation at the thinner tooth region. The torque can be improved by varying the width of the conductors. Reducing the width of the conductors of smaller cross-sectional area with or without reducing the height can increase the tooth width close the air gap. This change in conductor width can improve the peak torque and simultaneously reduce the losses in the machine.

A new asymmetric bar winding concept along with the analysis and benefits for high-speed electric machines has been presented. The ac losses, especially at high speeds, can be reduced utilizing optimized and asymmetric conductor heights within a slot for bar wound stators. Detailed winding diagram, height optimization, AC loss analysis, and thermal performance were presented for both symmetric (conventional) and asymmetric bar windings. The disclosed concept was validated using closed-form analytical equation and 2-D time stepped FEA. A substantial reduction of AC losses and improvement in continuous power over a wide operation range was achieved as demonstrated for a 100 kW high-speed (15,000 rpm) PM traction machine. Thermal performance analysis using forced liquid cooling was also included. The design and analysis methodology supports high-speed traction electric machine designs to meet ever-increasing demands on efficiency and performance with bar-type windings.

It should be emphasized that the described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A bar wound stator, comprising
   a stator core comprising winding slots that extend generally radially outward from a proximal end adjacent to a rotor air gap surface of the stator core to a distal end adjacent to a back-iron section of the stator core;
   a first group of bar type conductors disposed in the winding slots adjacent to the proximal end, the first group of bar type conductors having a first height and a first cross-sectional area; and
   a second group of bar type conductors disposed in the winding slots adjacent to the distal end, the second group of bar type conductors having a second height greater than the first height and a second cross-sectional area greater than the first cross-sectional area, wherein the first height is $(1-x)h$ and the second height is $(1+x)h$, where $0<x<1$ and h is a height of the conductors in a radial direction.

2. The bar wound stator of claim 1, wherein x is less than or equal to 0.25.

3. The bar wound stator of claim 1, wherein x is less than or equal to 0.2.

4. The bar wound stator of claim 1, wherein the first group of bar type conductors have a first width and the second group of bar type conductors have a second width greater than the first width.

5. The bar wound stator of claim 4, wherein a proximal end width of the winding slots is less than a distal end width of the winding slots.

6. The bar wound stator of claim 5, wherein the proximal end width is constant over a height of the first group of bar type conductors and the distal end width is constant over a height of the second group of bar type conductors.

7. The bar wound stator of claim 1, wherein the first group of bar type conductors have M bar conductors and the second group of bar type conductors have at least M bar conductors.

8. The bar wound stator of claim 7, wherein a total number of conductors in the first group of bar type conductors are less than a total number of conductors in the second group of bar type conductors.

9. The bar wound stator of claim 1, wherein the first group and second group of bar type conductors are coupled together to form a wave winding in the stator core.

10. The bar wound stator of claim 9, wherein the wave winding has a hairpin construction.

11. The bar wound stator of claim 9, wherein a conductor of the first group of bar type conductors is coupled to a conductor of the second group of bar type conductors by a weld.

12. A motor, comprising:
a bar wound stator, comprising
  a stator core comprising winding slots that extend generally radially outward from a proximal end adjacent to a rotor air gap surface of the stator core to a distal end adjacent to a back-iron section of the stator core;
  a first group of bar type conductors disposed in the winding slots adjacent to the proximal end, the first group of bar type conductors having a first height and a first cross-sectional area; and
  a second group of bar type conductors disposed in the winding slots adjacent to the distal end, the second group of bar type conductors having a second height greater than the first height and a second cross-sectional area greater than the first cross-sectional area, wherein the first height is $(1-x)h$ and the second height is $(1+x)h$, where $0<x<1$ and h is a height of the conductors in a radial direction; and
a rotor.

13. The motor of claim 12, wherein the rotor is a permanent magnet (PM) rotor.

14. The motor of claim 13, wherein the PM rotor is an interior PM rotor.

15. The motor of claim 12, wherein the first group of bar type conductors have a first width and the second group of bar type conductors have a second width greater than the first width.

16. The motor of claim 15, wherein a proximal end width of the winding slots is less than a distal end width of the winding slots.

17. The motor of claim 16, wherein the proximal end width is constant over a height of the first group of bar type conductors and the distal end width is constant over a height of the second group of bar type conductors.

18. The motor of claim 12, wherein x is less than or equal to 0.25.

19. The motor of claim 12, wherein the first group and second group of bar type conductors are coupled together to form a wave winding in the stator core.

20. The bar wound stator of claim 19, wherein the wave winding has a hairpin construction.

* * * * *